(12) United States Patent
Janssen

(10) Patent No.: US 10,478,699 B2
(45) Date of Patent: Nov. 19, 2019

(54) FULL SCALE PRACTICE AND TRAINING SYSTEM, METHOD AND SOFTWARE MEDIUM UTILIZING PROGRAMMABLE CHASSIS DRIVEN DRONES AND TACKLING DUMMIES IN SINGULAR AND MULTIPLE VARIANTS SUCH AS USE BY POSITIONAL PLAYERS IN SOLE AND TEAM-BASED SPORTS AS WELL AS OTHER NON-ATHLETIC TRAINING APPLICATIONS

(71) Applicant: Brian Janssen, Brookfield, WI (US)

(72) Inventor: Brian Janssen, Brookfield, WI (US)

( * ) Notice: Subject to any disclaimer, the term of this patent is extended or adjusted under 35 U.S.C. 154(b) by 0 days.

(21) Appl. No.: 15/715,510

(22) Filed: Sep. 26, 2017

(65) Prior Publication Data

US 2018/0015347 A1    Jan. 18, 2018

Related U.S. Application Data

(63) Continuation-in-part of application No. 15/484,326, filed on Apr. 11, 2017.

(Continued)

(51) Int. Cl.
*H04W 4/02* (2018.01)
*A63B 69/00* (2006.01)
(Continued)

(52) U.S. Cl.
CPC ............ *A63B 69/345* (2013.01); *A63B 69/00* (2013.01); *A63B 71/0622* (2013.01); *G01S 19/19* (2013.01); *G06T 7/246* (2017.01); *G09B 19/0038* (2013.01); *H04W 4/025* (2013.01); *A63B 69/40* (2013.01); *A63B 2071/0625* (2013.01); *A63B 2071/0647* (2013.01); *A63B 2102/02* (2015.10); *A63B 2102/18* (2015.10); *A63B 2102/24* (2015.10);
(Continued)

(58) Field of Classification Search
None
See application file for complete search history.

(56) References Cited

U.S. PATENT DOCUMENTS 6,220,865 B1 * 4/2001 Macri .................... A63B 69/00
434/247
6,710,713 B1    3/2004 Russo
(Continued)

OTHER PUBLICATIONS

Office Action dated Mar. 8, 2019 in counterpart U.S. Appl. No. 15/484,326, 33 pages.

*Primary Examiner* — James S. McClellan
*Assistant Examiner* — Peter J Iannuzzi
(74) *Attorney, Agent, or Firm* — Dinsmore & Shohl LLP

(57) ABSTRACT

A system for providing full scale participant practice and instruction by at least one self-propelling drone including a control platform incorporating a first processor. A second processor is incorporated into the drone which is in operative communication with the control platform, the second processor receiving a stream of instructions for operating a powered drive chassis incorporated into the drone for traversing the drone upon a practice surface during a training iteration. The stream of instructions includes at least one algorithmic protocol for instructing the drive chassis to execute a progression of movements either mimicking or responding to physical movements of a physical participant engaged in the training iteration.

16 Claims, 24 Drawing Sheets

Related U.S. Application Data

(60) Provisional application No. 62/320,642, filed on Apr. 11, 2016.

(51) Int. Cl.

| | | |
|---|---|---|
| *G01S 19/19* | (2010.01) | |
| *G09B 19/00* | (2006.01) | |
| *A63B 69/40* | (2006.01) | |
| *A63B 69/34* | (2006.01) | |
| *G06T 7/246* | (2017.01) | |
| *A63B 71/06* | (2006.01) | |
| *A63B 102/24* | (2015.01) | |
| *A63B 102/02* | (2015.01) | |
| *A63B 102/18* | (2015.01) | |

(52) U.S. Cl.
CPC ....... *A63B 2207/02* (2013.01); *A63B 2220/10* (2013.01); *A63B 2220/12* (2013.01); *A63B 2220/40* (2013.01); *A63B 2220/53* (2013.01); *A63B 2220/806* (2013.01); *A63B 2225/20* (2013.01); *A63B 2225/50* (2013.01); *A63B 2225/54* (2013.01); *A63B 2243/007* (2013.01); *A63B 2243/0025* (2013.01); *A63B 2243/0037* (2013.01); *A63B 2243/0066* (2013.01)

(56) References Cited

U.S. PATENT DOCUMENTS

| | | | |
|---|---|---|---|
| 7,505,607 B2 | 3/2009 | Meunier et al. | |
| 7,527,568 B2 | 5/2009 | Joseph | |
| 7,625,314 B2 * | 12/2009 | Ungari | A63B 69/0053 482/1 |
| 7,927,253 B2 | 4/2011 | Vincent et al. | |
| 7,951,045 B1 | 5/2011 | Brader | |
| 8,172,722 B2 | 5/2012 | Molyneux et al. | |
| 8,231,506 B2 | 7/2012 | Molyneux et al. | |
| 8,279,051 B2 | 10/2012 | Khan | |
| 8,289,185 B2 | 10/2012 | Alonso | |
| 8,368,721 B2 | 2/2013 | McCoy | |
| 8,562,487 B2 | 10/2013 | Berggren et al. | |
| 8,622,795 B2 | 1/2014 | Edis et al. | |
| 8,622,832 B2 | 1/2014 | Marty et al. | |
| 8,968,100 B2 | 3/2015 | Hohteri | |
| 9,192,849 B2 * | 11/2015 | Suhr | G09F 13/005 |
| 9,195,885 B2 | 11/2015 | Burton et al. | |
| 9,415,263 B2 * | 8/2016 | DeCarlo | A63B 24/00 |
| 2003/0077556 A1 | 4/2003 | French et al. | |
| 2004/0039055 A1 | 2/2004 | Lopaschuk | |
| 2005/0004999 A1 | 1/2005 | Moore | |
| 2005/0162257 A1 | 7/2005 | Gonzalez | |
| 2006/0281061 A1 | 12/2006 | Hightower et al. | |
| 2008/0134583 A1 | 6/2008 | Polus | |
| 2008/0140233 A1 | 6/2008 | Seacat | |
| 2009/0036205 A1 * | 2/2009 | Seacat | A63B 69/002 463/30 |
| 2009/0091583 A1 | 4/2009 | McCoy | |
| 2009/0189982 A1 | 7/2009 | Tawiah | |
| 2010/0035724 A1 * | 2/2010 | Ungari | A63B 69/0053 482/4 |
| 2011/0242507 A1 * | 10/2011 | Smith | A63B 69/00 353/121 |
| 2013/0066448 A1 * | 3/2013 | Alonso | H04Q 9/00 700/91 |
| 2013/0317634 A1 | 11/2013 | French et al. | |
| 2014/0080638 A1 | 3/2014 | Feng et al. | |
| 2015/0112646 A1 | 4/2015 | Kamal et al. | |
| 2015/0348427 A1 | 12/2015 | Peregrim | |
| 2016/0374171 A1 * | 12/2016 | Wilken | H05B 33/0863 |

* cited by examiner

FIG. 10
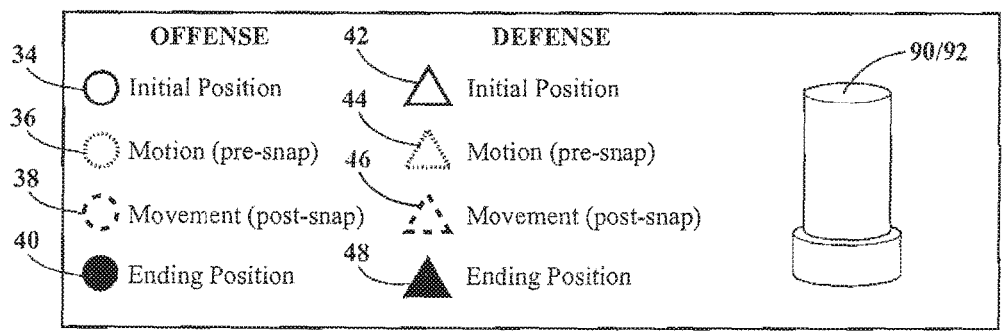
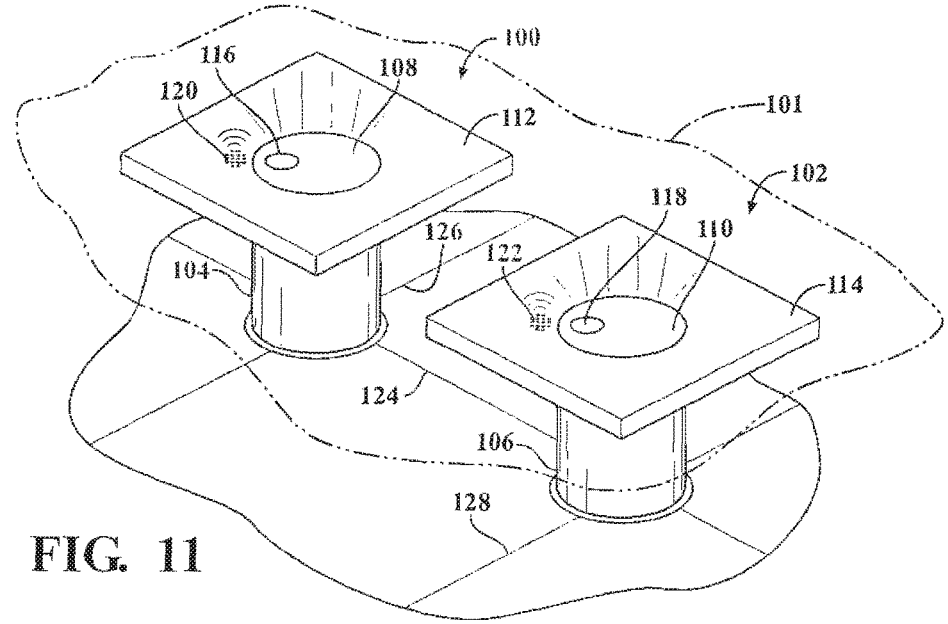
FIG. 11
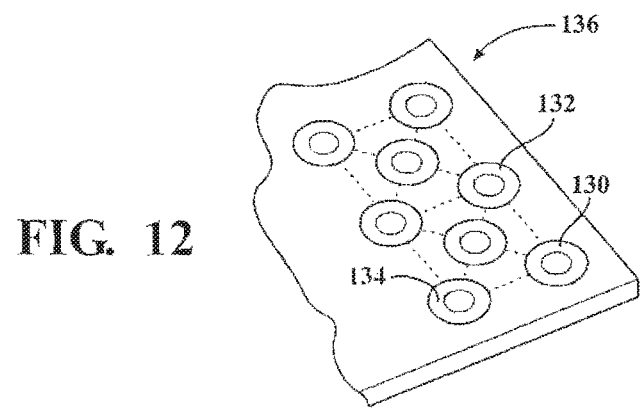
FIG. 12

System management architecture
(Drone Management System – DMS) 191

Interface (21)

*Play creator/builder*
- Video input and edit
- Sketch input and edit
- Scanned input and edit
- Electronic input and edit

*Play cataloger*
- Teams
- Players
- Games, seasons, etc.
- Practice, development, etc.

*Play scripter/trainer*
- Play selector and sequencer
- Play phase timing manager
- Players / sub-units

*Player management*
- Performance history
- Play history
- Characteristics, capabilities, tendencies

*Play / session management system*
- Initiate / record session
- Acquire field and device inputs

Processing (23)

*Control system*
- Manages interfaces with inputs and outputs
- Manages interactions and coordination / synchronization of subsystem components (e.g., lights, sensors, players, drones, devices*)
- System time synchronization (e.g., Network Time Protocol)

Subsystems 193

*Player(s) mgmt*
- Location
- Data capture

*Field/grid mgmt*
- Inputs / outputs
- Data capture

*Drone mgmt*
- Movement
- Lighting
- Data capture

*Device mgmt*
- Movement
- Lighting
- Data capture

*User interface*
- Computer
- Tablet
- Phone
- Voice control

*Light and sensor mgmt*
- Capture / acquisition
- Rendering
- Storage

*Analytics*
- Play comparator
- Play analyses
- Player analyses
- Play history analyses

*Database(s)* 192
- Video
- Play database
- Field data
- Device data

Field and devices (25)

*Inputs and outputs (field/display)*
- Light management and play rendering
- Text
- Audio (microphones, speakers)
- Sensors (e.g., pressure)

*Inputs and outputs (player, devices, drones)*
- Audio (microphones, speakers)
- Sensors (e.g., pressure)
- Lights
- Accelerometers

*Player positioning*
- Tagging
- Grid location
- WiFi, BLE, NFC, RFID, ZigBee, ANT

*Device(s) positioning*
- Tagging
- Grid location
- WiFi, BLE, NFC, RFID, ZigBee, ANT

*Drone(s) positioning*
- Tagging
- Grid location
- WiFi, BLE, NFC, RFID, ZigBee, ANT Note: *devices could be activity-related components, accessories, etc. such as footballs, hockey pucks, and baseballs

FIG. 15A

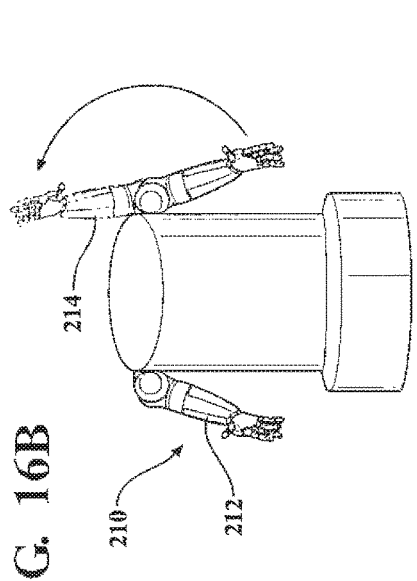
FIG. 16B
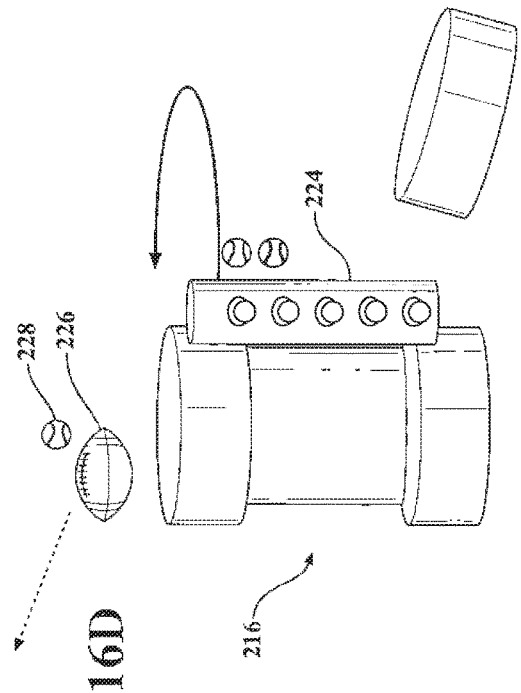
FIG. 16D
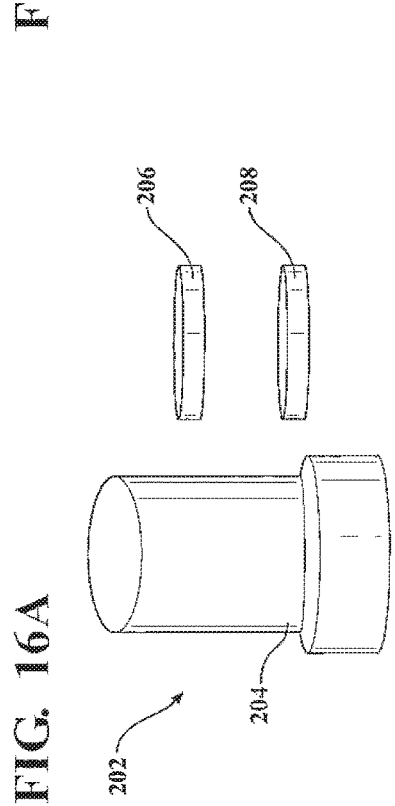
FIG. 16A
FIG. 16C

FULL SCALE PRACTICE AND TRAINING SYSTEM, METHOD AND SOFTWARE MEDIUM UTILIZING PROGRAMMABLE CHASSIS DRIVEN DRONES AND TACKLING DUMMIES IN SINGULAR AND MULTIPLE VARIANTS SUCH AS USE BY POSITIONAL PLAYERS IN SOLE AND TEAM-BASED SPORTS AS WELL AS OTHER NON-ATHLETIC TRAINING APPLICATIONS

CROSS REFERENCE TO RELATED APPLICATIONS

The present application is a continuation-in-part of U.S. Ser. No. 15/484,326 filed Apr. 11, 2017. The '326 application claims the priority of U.S. Ser. No. 62/320,642 filed Apr. 11, 2016, the contents of which is incorporated herein in its entirety.

FIELD OF THE INVENTION

The present invention discloses a processor based drone management system for controlling (or choreographing) the movement of any plurality of drones and associated devices including play recording, review and execution features. Additional aspects of the present design include the ability of the drones to represent the two dimensional movement of an individual (training or practicing person or player) on a surface, such as which is augmented with devices associated with a given activity (e.g. football), sensors, and audio or visual inputs and outputs.

Related non-transitory computerized methods, computer readable storage medium and computer program product utilizing code components are also integrated into the drone management system for effectively choreographing the movement(s) of the individual or plural independently chassis driven devices in a manner which can emulate the full scale execution of movement in a given activity being practiced, trained or otherwise monitored. This can further include a first version of an operating algorithm in which drone execution is automated to a given protocol instruction (such as in an arrangement of offensive drones in a first football training protocol), with a further version providing adaptive algorithms for modifying drone executed motion in real time response to movement of the practicing or training players (such as in the further instance of an arrangement of defensive drones in a second football training protocol executing different defensive schemes and their variants (e.g., 3-4, 3-4 Cover 3 Zone Blitz, 4-3, 4-4, 5-2)).

Additional aspects of the present invention can also include a full scale replay and practice system for team-oriented practice sessions and individual match-up simulation and which provides an enhanced audio-visual system, process, and computer readable medium focusing on individual positional-based digital replay within a team-based sport in order to provide for both team and individual player development, including providing better simulation of game-play speed and precision of opponent players.

The present system also provides full scale visual references for players and coaches of plays, routing, timing, speed, defensive zone coverage areas, etc., as opposed to only traditional playbook, film, or tablet play review. Additional purposes of the present system includes the ability to reduce practice team size and for the player (or team unit) to practice individually and efficiently, as well as the system enables uniform and repeatable testing and evaluation of each player, unit, or team, such as by repeating an identical play protocol.

Features include the ability to present a planned play's time sequenced, choreographed component execution and track time and motion progression of the player(s) as represented by either or both of illuminating elements embedded within a field/court surface or being represented on a visual display associated with a communicating and processor driven device. The following disclosure and appended illustrations further clarify that the invention could be provided as any of a field, turf, court, rink, or other surface embedded or supported grid, light, sensor, or other non-limiting arrangement, such further being integrated into any plurality of elongated mat rolls, interconnected grid components, etc. within which the illuminating elements are integrated.

BACKGROUND OF THE INVENTION

Prior art systems are generally known for providing computerized or processor-based tracking of sporting events. A first example of this is the system of Aldridge et al., US 2015/0312504 for recording and timing of events, such including a camera system for capturing images of the events and having a clock. An event recorder is provided for detecting the events and is communicated with the clock. A data processing system assigns times provided by the clock to the images captured by the camera system and events detected by the event recorder.

DeAngelis et al., US 2011/0169959 teaches a computer implemented method for determining a target situation in an athletic event. Positional information including the relative positions of a group of selected participants is initially received from a tracking system, with the aggregate motion of the selected participants being detected in real-time using the positional information. In this fashion, the target situation may be determined to have occurred when a change in the aggregate motion occurs in accordance with a predetermined characteristic during an initial time interval.

A related system and method for providing feedback to at least one participant in a field of play is disclosed in DeAngelis et al., US 2012/0081531, and in which a performance analysis device determines performance information of each participant in the field of play, such information being based upon at least one of determined location, speed, path, acceleration, and biometrics of each participant. At least one output device provides real-time feedback to the participant based upon the performance information. The real-time feedback includes performance information of the participant and/or of one or more of the other participants in the field of play.

A further related object tracking and anti-jitter filter system and method is disclosed in DeAngelis et al., US 2014/0132452, and in which a plurality of raw location points is received from a tracking tag attached to a tracked object. The location points are stored within a raw location points buffer and, such points within an averaging window are averaged to generate an averaged location point, such being stored within an averaged location points buffer for use within the object tracking system.

The technology associated with the above references is commercially incorporated into a self-contained player tracking system and game analysis technology (IsoLynx, LLC and Lynx System Developers, Inc.) which automatically locates every athlete on a field with a precision calibrated at 25 intervals/iterations per second. Intelligent automatic cameras are provided for targeting to provide isolation video coverage for any player or object of interest and which follow assigned targets anywhere within its range of imaging. An associated software package communicates with all of the cameras to provide a display output (such as on any digitally reproducing television as well as on digital screens associated with any of a mobile phone, tablet, or laptop/desktop computer) for displaying, storing, and replaying of every player's location, such being linked to time-synchronized video feeds.

Dartmouth College's online publication, which can be accessed at URL website http://now.dartmouth.edu/2015/08/dartmouth-football-kicks-high-tech-season, discloses a virtual reality practice technology, known as STRIVR, which uses an Oculus Rift headset and a customized multi-camera device designed to take video in all directions. The system allows players to put on the headset and be totally immersed in a live-action practice with their teammates on their home field.

Another feature of the system is the provision of a mobile virtual player (MVP or mobile tacking dummy) which is provided in the form of a wheeled, self-righting, and remotely controlled assembly which simulates a football player and their movement thereby allowing players to make full contact while minimizing head and neck injuries. The MVP is capable of being remotely controlled, such as by a coach or other individual.

An example of the mobile virtual player (MVP) is depicted in U.S. Pat. No. 9,427,649 to Teevens which simulates a player motion and includes a ball drive, omni-directional members positioned proximate to and in engagement with the ball drive, at least one motor connected to the omni-directional members and providing a motive force to the members and ball drive, a controller controlling the motor and pads positioned on the device. The device is described as mimicking the unpredictable motion of a live player to provide a safe alternative to live play to increase player safety and decrease incidence of injuries during practice sessions.

Related controlled mobile practice dummies and devices further include each of Kastner USSN 2016/0375337 and Peterson US 2013/0053189. In the particular case of Kastner '337, the device can also include an on-board processor along with motion sensors for allowing the device to evade or attack approaching objects or tacklers. Other features include any combination of location or proximity detection devices for initiating un-programmed response motion of device (e.g. evasive maneuvers). A sensor-locator system could be incorporated into player uniforms or helmets and the device may also include cameras for first person view and ease of driving and/or film review for training purposes.

U.S. Pat. No. 9,588,519, to Stubbs, teaches short range transmissions used to identify potential interactions between warehouse workers and warehouse robots in automated warehouses. The robot can be equipped with one or more short range transmission tags, such as radio frequency identification (RFID) tags, while the warehouse worker can be equipped with a short range transmission reader, such as an RFID reader. The robot can detect a warehouse worker that is within range when the RFID tags on the robot are written to by the RFID reader. The warehouse robots and warehouse workers can also be equipped with one or more cameras to identify fiducials in the automated warehouse and to report their positions. A central control or interaction server can ensure that warehouse robots and warehouse workers are routed appropriately to avoid incidents.

Yeager, US 2016/0310817 teaches a robot for playing games and drills on a standard court or field, such as for dispensing tennis balls, during which the robot will simulate the competitive play of a human opponent with specific playing characteristics such as strategy, physicality, playing style and skill level. The robot is small enough and light enough to be easily stored, transported and deployed; has a ball storage device for retrieving, storing and dispensing the balls; can reload the balls into the ball storage device by catching them or by autonomously reloading them; has a ball firing system that is compact, lightweight and efficient, that can generate the shot dynamics that the corresponding human opponent would be capable of generating; has a drive system that makes it capable of moving around the court at speeds that are comparable to the speed of the human opponent that is being simulated; has the ability to call shots In or Out, keep the score, provide coaching, and keeps a record over time of the player's performance against different categories of simulated opponents.

SUMMARY OF THE PRESENT INVENTION

The present invention discloses a processor based drone management system for controlling (or choreographing) the movement of any plurality of drones and including play recording and execution features. Additional aspects of the present design include the ability of the drones to represent the two dimensional movement of an individual (training or practicing person or player) on a surface, such as which is augmented with devices associated with a given activity (e.g., football), sensors, and audio or visual inputs and outputs.

Related non-transitory computerized methods, computer readable storage medium and computer program product utilizing code components are also integrated into the drone management system for effectively choreographing the movement(s) of the individual or plural independently chassis driven devices in a manner which can emulate the full scale execution of movement in a given activity being practiced, trained or otherwise monitored. This can further include a first version of an operating algorithm in which drone execution is automated to a given protocol instruction (such as in an arrangement of offensive drones in a first football training protocol), with a further version providing adaptive algorithms for modifying drone executed motion in real time response to movement of the practicing or training player (such as in the further instance of an arrangement of defensive drones in a second football training protocol executing different defensive schemes and their variants (e.g., 3-4, 3-4 Cover 3 Zone Blitz, 4-3, 4-4, 5-2)).

Additional aspects of the system include, along with associated method and computer readable medium, providing full scale positional player training with digital replay capabilities of an individual engaged in a physical event, such including any of a positional (team) based sport or individual one-on-one competition event. This can include, in combination with the drones, provision of a grid of interconnected, processor controlled and communicable lighting elements which are embedded within a surface associated with the event (non-limiting examples of which can include any of a turf, hard court, ice arena, gymnastics mat or floor, etc.). The present invention also envisions sound/audial components as well as pressure, sound, etc. sensors which can operate separately or in combination with the lighting elements.

The lighting elements, in one non-limiting application, interface with at least one of the player wearable sensors, as well as interfacing with a remote processor device for receiving signals from the sensors and, in response thereto, providing an audio visual representation, to one or more external devices, of any number of parameters associated with individual performance. In a further simplified application, the lights are operated by a separate control platform in order to provide a progressing play or player position and orientation representation simulating real time game play whether from a designed playbook play, practiced play, or previously recorded game play, such a control platform further providing the ability to modify the light projections and sequences in response to additional inputs provided by the player wearable sensor and such as in order to further modify a progressing light sequence in response to "in play" movement of the training player(s). The lighting elements can be further used to indicate a planned defensive scheme (e.g., zone coverage areas) to an opposing offensive play setup. In this example, the defensive players(s) progressions or movements during the play can be tracked and aligned with the initial planned defensive scheme. Via the system management/control system, the full scale play progressions (of the lights and/or drones) for one or more player components can be rewound or backed-up in a step-like fashion, forwarded in a step-like fashion, resumed, slowed-down, speeded-up, have a segment repeated, etc. to enhance the learning process much like the controls on a video recorder device replaying a film.

Additional features include the provision of at least one sensor further including a plurality of sensors associated with any of the positional player, a game ball, and/or an opposing player. The player or playing surface illuminating lighting array can further include color controlled lighting elements integrated into the player or game play ball for assisting in providing or enhancing visual representation/indication of any of speed, acceleration, trajectory, situational status changes, etc., of either or both the players and/or the game ball (football, baseball, basketball, hockey puck, etc.).

Other features include a control platform associated with the processor device for assembling and recording a plurality of the signals into a consecutive number of play files for any of each of a plurality of game plays, as well as for play capture and review comparison, analysis, and metrics. This can also include "scripted" plays such as in a football application in which a first drive series results in a succession of plays occurring in a no huddle sequence.

A non-limiting variant of the invention includes the provision of any number of sensors associated with the individual and such as which can be worn on the uniform or attached to a part of the player's equipment. Additional aspects of the system further include any number of robots/droids/drones which can be integrated into the game play defined space and which is processor controlled for instructing aspects of the positional team player training protocols such as but not limited to play and player setup, routes, and patterns. Such droids or robots (an example of which can include a processor controlled and mobile tackling dummy) can further include any one or more of input sensors, ball delivery capabilities, remote return functionality, as well as having integrated light and audio outputs and sensor inputs. Yet additional features include the provision of cameras or digital recording devices, such as which can be embedded within any of the positional/opposing players and/or any interactive droid or robotic devices, this again including utilization in any type of "full scale" or three dimensional simulations.

BRIEF DESCRIPTION OF THE DRAWINGS

Reference will now be made to the attached drawings, when read in combination with the following detailed description, wherein like reference numerals refer to like parts throughout the several views, and in which:

FIG. 10 is a representation of the robot of FIG. 9 combined with example light images/shapes representing player positions of FIGS. 4-7;

FIG. 11 is an illustration of one non-limiting illuminating array of connected light illuminating/sound emitting elements including flush upper surface positioned and durable lens surfaces which are incorporated into an embedded body surrounded by pressure or motion sensor pads and potentially audio recording/microphone devices;

FIG. 15A is a further illustration of a system management architecture associated with the control platform of FIG. 15 and providing additional detail as to each of interface, processing and field/device components associated with the present invention;

FIGS. 16A-16D illustrate examples of additional configurations to the drones which can be utilized as part of a game play system utilizing the field of play embedded lights/sensors, as well as standalone applications in which the robots/droids are provided without the field sensors for providing any type of individualized or choreographed simulation for providing positional player and team playing options;

DETAILED DESCRIPTION OF THE PREFERRED EMBODIMENTS

As will be described in reference to the following illustrations, the present invention teaches each of an enhanced audio-visual system, process, and computer readable medium. As will be further described, the system includes (to scale) full and life size replay and associated player analysis functionality, focusing on individual positional based digital replay within any individual or team-based sport in order to provide for both team and individual player development, including providing better full scale, on-field simulation of game-play speed and precision of opponent players, and beyond which is provided by prior art game play tracking and analysis technology, notably the IsoLynx systems described in the background art section. Additional applications of the present system include the use of programmed droids (such not limited to tackling dummy's with portable drive mechanisms) which can be provided both as part of a light/sound/pressure sensor grid environment, as well as which can be provided according to a dedicated or stand-alone player training environment to provide player practice and instruction (the term player training being loosely applied and understood to refer to any individual engaged in a simulated training sequence which can also include applications outside sports such as in law enforcement training protocols and like environments).

Figure 8:
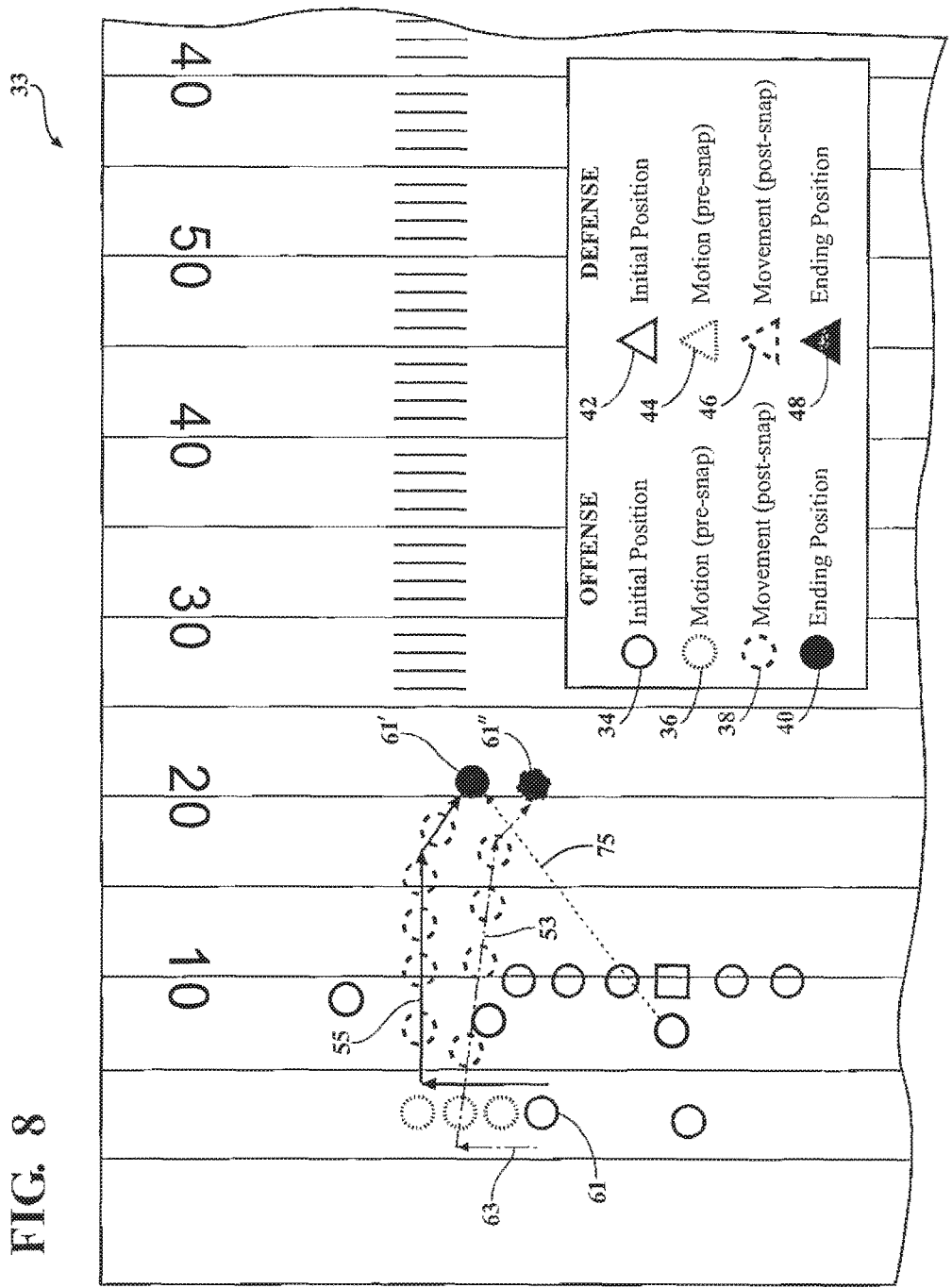
FIG. 8 is a further positional play training illustration providing a depiction of play execution including any of individual, sub-team, full-team, and play practice scenarios with individual game play, including diagramming of on field planned play execution, run play, routes, or other motions with or without planned play highlighted on the field, and showing comparisons or actual versus planned routes post play execution, including analysis and metrics information in field using lighting to show message such as passing execution, late, wrong route, percentage of speed of play, etc., such information being viewable on tablet or other control devices as well.

In one non-limiting application, the present invention teaches a full scale replay and practice system for team-oriented sport practice sessions and including in particular individual positional player match-up simulations, such including individual playbook training showing, visually to scale, what a given play, i.e. offense vs. defense or vice-a-versa, should look like in terms of route, timing, etc., and further depicting as to how a given play was practiced and then compared with analysis and metrics (see FIG. 8). Such system could further be used in a manner to test, score, rank, etc. a player's, unit's, or team's knowledge of a team's playbook by announcement of a series of plays to run, recording the executed plays, and then comparing the planned vs. actual execution. Aspects of the system, process and computer readable medium include the ability to simulate or replicate game plays (such as broken down by position) at any of full speed or slowed speed, as well as at any enhanced/speed plus rate. The system likewise applies to defense practice at any speed (plus or minus) to train or get used to opposing simulated player speed(s) and ball routing, such being further reflected by any or all of light/audio progressions displayed and emitted from the field of play along with replicating remote illustrations on any processor display device. Additionally, defensive coverage scheme(s) play design, execution, and adherence can be visually displayed, recorded and replayed. This functionality further provides the ability to simulate positional player training in each of route running (e.g., in the instance of a football version with a wide receiver position (such as an ally or fellow team player) playing opposite a safety or defensive back) or other positional player motion associated with the play or other game progression protocol.

Figure 1:
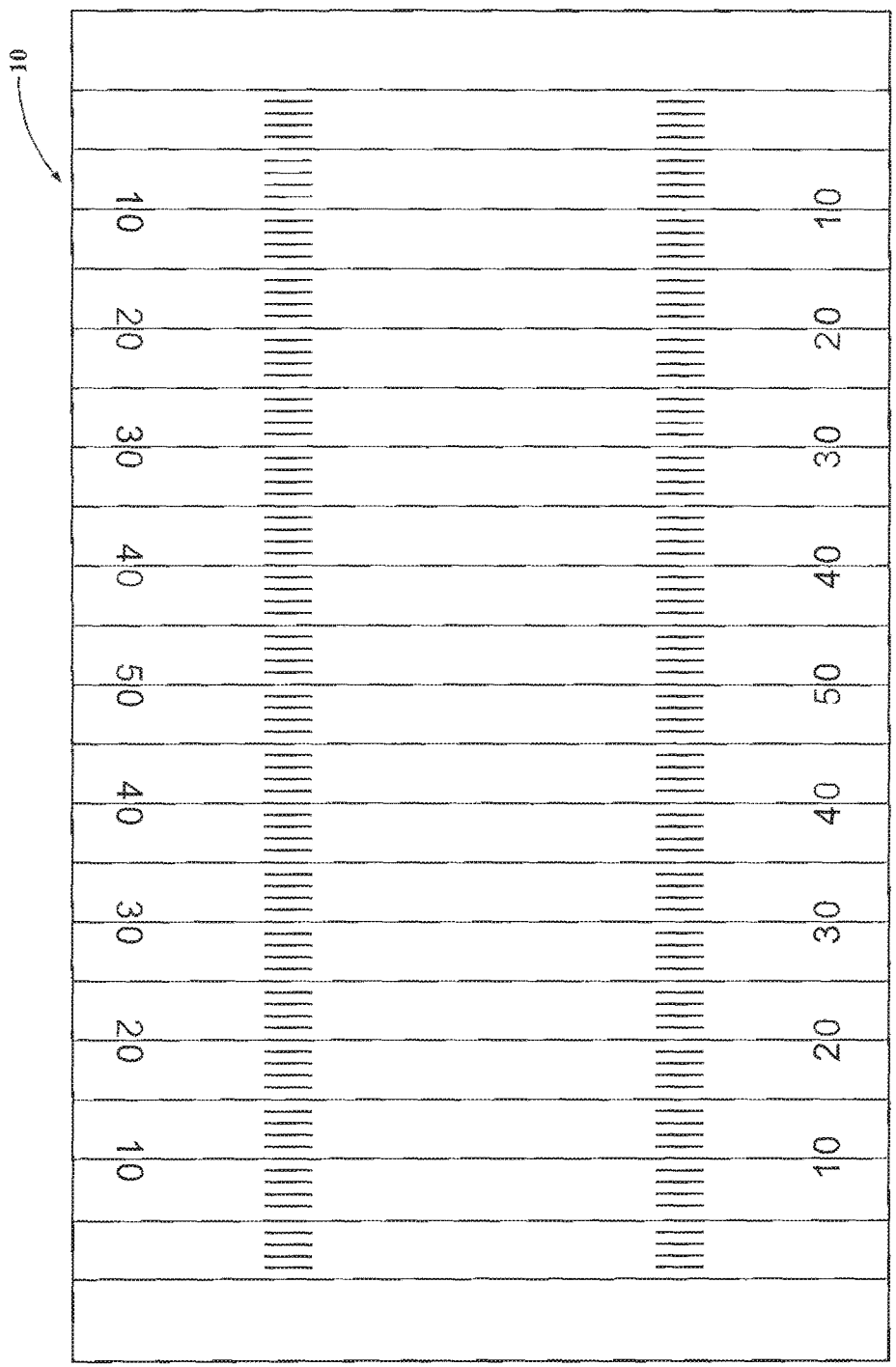
FIG. 1 is a plan view representation of a typical field of play according to the Prior Art which is presented in the form of a football field but can be any type of court, rink, field, gymnastic mat, floor mat, etc. and which can form part of any system, method and/or associated non-transitory computer readable or software algorithmic media associated with the present inventions.
Figure 2:
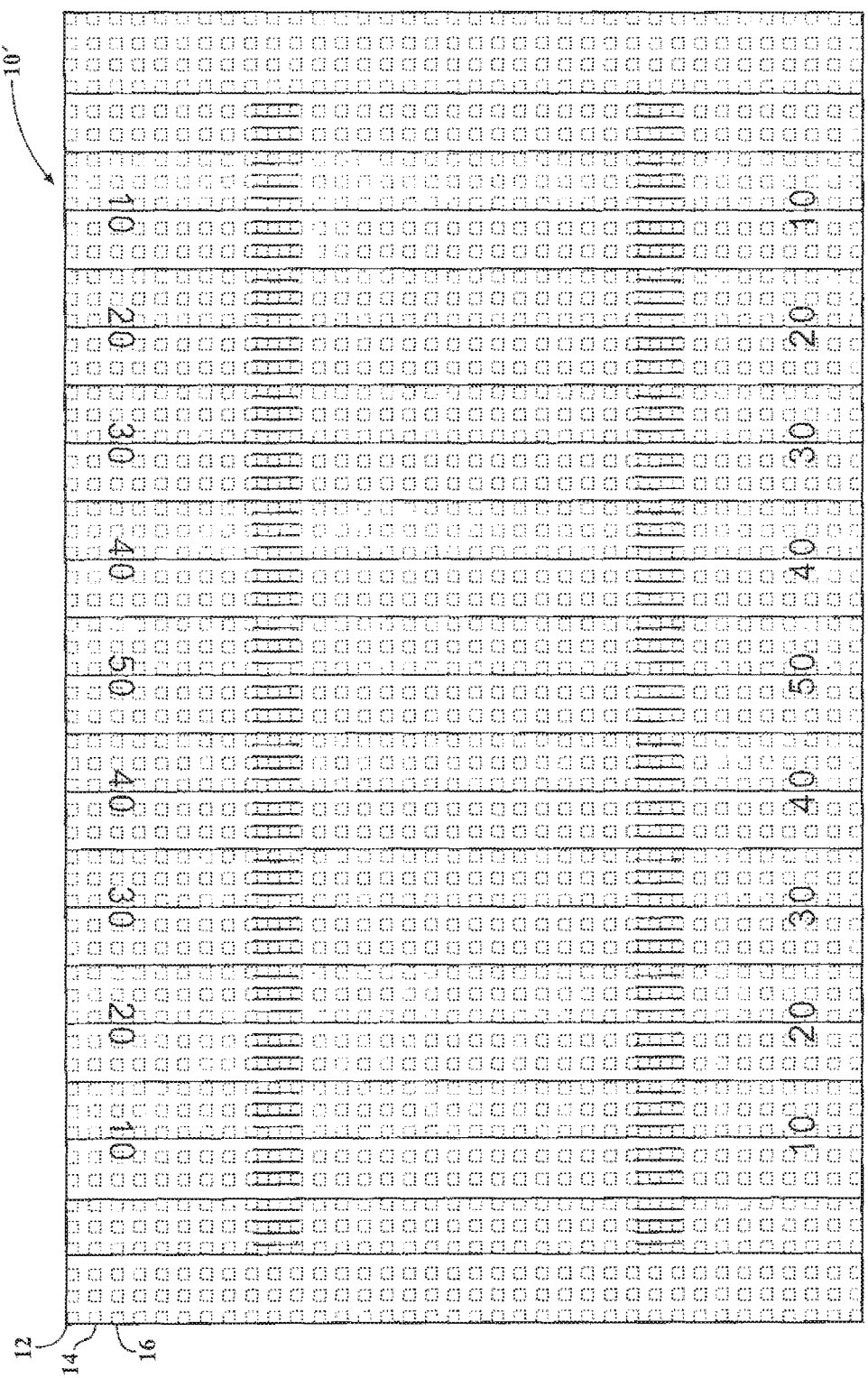
FIG. 2 is a succeeding illustration showing a grid of multi-colored lights and input sensors embedded within the field of play according to a two dimensional variant, the lights and sensors(s) configurations and associated modules typically each integrating any form of a single board processor, without limitation including any type of (Raspberry Pi or other single/multiple board processor depending upon the processing requirements of the application. The processor is further arranged in any version of wireless communication, such including but not limited to any of Bluetooth, Bluetooth Low Energy, ZigBee, ANT (Multi-Cast Wireless Sensor Network Technology), WiFi, NFC (Near Field Communication) or any suitable communication with additional sensors associated with the positional player and related devices (e.g., football) and which can provide different light densities or colors for designating such as field positioning accuracy, with higher density outputs being used to create lines and shapes (e.g., player type such as center, lineman, receiver, etc. of varying widths, styles, blink rates, etc.) and show situation state changes, as well as showing the embedded sensors in the field of play which can also be just in communication with the other sensors.

Given the above, and referencing initially to FIG. 1, a plan view representation 10 is provided of a typical field of play according to the existing Prior Art which is presented in the form of a football field but can be any type of court, rink, field, playing surface mat, etc. and which can form part of any of a system, method and/or associated non-transitory computer readable or software algorithmic media associated with the present inventions. FIG. 2 is a succeeding illustration of a game play field 10; according to one non-limiting illustration of the present invention (e.g., again showing a football field layout similar to FIG. 1) and depicting a grid of multi-colored lights, see as depicted as individual light supporting bodies at 12, 14, 16, et seq., which can be any of embedded within or projecting from the field of play (such shown as a football field with end zones) according to an initial two dimensional variant of the present inventions.

Additional non-limiting variants can include the lighting/audio/pressure sensors or elements being embedded into any of astro turf, mat or embedded into hard courts, such as a basketball court floor, the individual elements each typically including a rigid upper transparent or translucent light emitting surface which cannot be damaged by the player stepping upon it and which is preferably positioned level with the playing surface so as not to interfere with practice play or training. Without limitation, the lights and supporting bodies can be provided as individual LED housings which are surface mounted into the field of play in a dedicated grid pattern (such as one per every one half square foot however can also be placed at other spatial iterations).

Without limitation, the LED components can provide either or both of color or intensity components and each typically integrates a resident battery power source along with any form of a single board processor (Raspberry Pi or the like) which is in wireless communication (e.g., Bluetooth, Bluetooth Low Energy, ZigBee, ANT, WiFi, NFC— Near Field Communication) with additional sensors associated with the positional player and related devices (e.g., football) as well as being in communication with one or more remote processor driven devices such as a PC tablet, phone, laptop, etc. ANT networks are further understood to reference one area of body area network (BAM) or personal area network (PAN) and denote proprietary (but open access) multicast wireless sensor network technologies defined by wireless communication protocol stacks that enable hardware operating in the 2.4 GHz ISM (industrial, scientific and medical) radio band (typically to physical ranges of up to 100 m) to communicate by establishing standard rules for co-existence, data representation, signaling, authentication and error detection. Conceptually, ANT networks are similar to Bluetooth low energy, but are oriented towards usage with sensors and are desired for use with low bit-rate and low power sensor networks, this in order to allow many ANT devices (via adaptive isochronous transmission) to communicate concurrently without interference from one another.

As will be described in further detail with reference to the succeeding illustrations, the individual lighting units can emit different light densities or colors (either three dimensionally in an upwardly projecting fashion or in association with a two dimensional template platform or surface depiction) for designating such as field positioning accuracy player movement/routing progression or tracing, with higher density outputs being used to create varying line thicknesses, styles, blink rates, etc. and shapes (e.g., player type such as center, lineman, receiver, etc., object ball location, and offense and defensive players, play state changes, zone coverage areas, and informational messages). Along these lines, it is further understood that the illuminating intensity and/or density of the lights (and shapes created thereby as will be further described) can be variable for representing any of player type/position for each sport to which the present system is applicable.

As will also be further described, the lighting elements can be progressively illuminated to provide vivid travel (player and object ball) progressions (in any of real time, speeded-up time or slowed-down time) to assist in player training protocols. The present invention further envisions the use of audio outputs, such as piezo speakers or the like, can be integrated into some or all of the lighting element and in order to additionally provide a life-like audio output aspect of a real time training protocol, such operating in combination with the progression of the light illuminating and sequencing for assisting in providing life-like game play simulation and training, and which can mimic first string quality player moves and techniques to assist in enhanced training of the positional player or review of team or opponent plays in a playbook.

Figure 3:
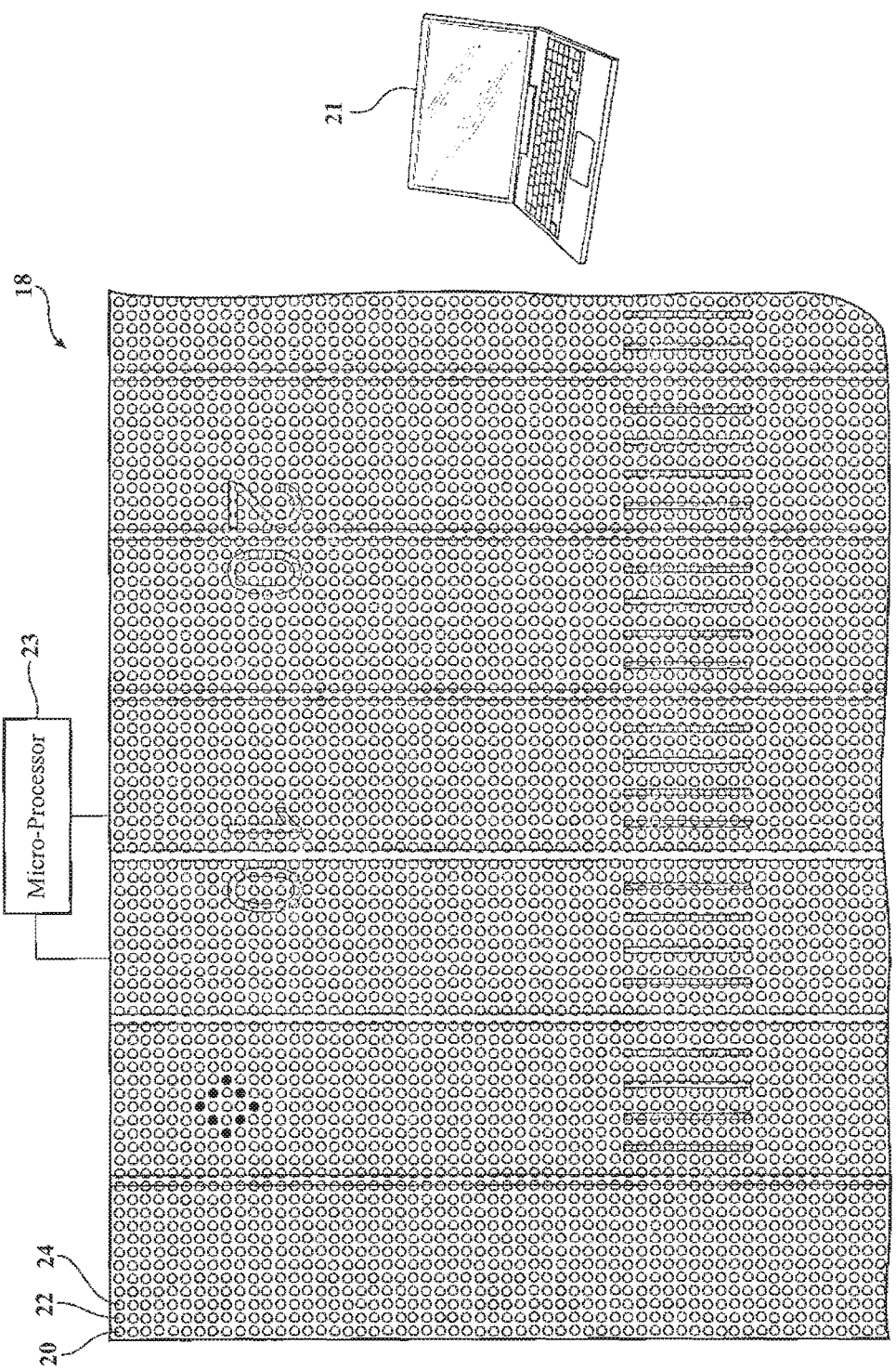
FIG. 3 is a succeeding detail field of play view which depicts a subset number of the light/sensor components along with a listing of field details/capabilities associated with the grid style arrangement and which, as is further described and additionally illustrated, includes the ability to mimick players movement (speed/acceleration, direction, etc.) both in terms of the practice player and a light show representation of an opposing player.

Proceeding to FIG. 3, a succeeding detail field of play view is generally shown at 18 which depicts a subset number of the light/sensor components, shown at 20, 22, 24, et seq., and which are understood to be any variation of those shown at 12, 14, 16, et seq. in FIG. 2, along with a listing of field details/capabilities associated with the grid style arrangement, including mimicking player movement (speed/acceleration, direction, etc.) both in terms of the practice player and a light show representation of an opposing player. The field detail depicted is again intended to include either or both of the LED (or other illuminating) components of FIG. 2, as well as potentially including additional sensors (e.g., pressure, sound) which are dispersed across the field of play in a manner which provides full coverage in a grid defined fashion and without obstructing player movement.

Additional envisioned variants of the system envision the individual light/sensor components 20, 22, 24, et seq. being independently controlled, either via the movement of the positional training player who may be wired with ground surface depressible motion/pressure sensors, or by a wirelessly communicating and external processor device having a display screen and including such as a smart phone, tablet, or laptop (as further represented at 21) which communicates with a processor (further at 23) in communication with the lighting display elements (or other types of sensors not limited pressure switch sensors and the like).

For clarification, the inventions contemplate any one of multiple and non-limiting applications, such as in one instance in which the player wearable sensors signal outputs which are read by inputs build into the grid and then translated to the associated control platform. The player worn sensors can also be communicated in two way fashion directly to the control platform without interfacing with inputs associated with the grid elements. A further application relies on the utilization of built in pressure switch aspect of the individual playing surface implanted elements for providing positional player tracking and progressions.

It is further understood that processor 23 can interface the field embedded individual units (again by any of wired or wireless protocols) with any number of the remote processor and display devices in turn connected by such as Internet based or other protocol.

In alternate embodiments, the remote processor devices (laptop 23) can directly interface with the field embedded units in a proximity located application (e.g., coach on the field with a mobile device). Regardless of the application, and without limitation, the individual light components are capable of displaying lines, shapes, etc., for representing player location, movement, play state changes (e.g., off sides, ball snapped), etc. (reference being further had to subsequent illustrations FIG. 4 et seq.).

An associated illumination density is also possible in order to provide a requisite level of detail required for tracking and replaying all player positions, movements, etc., as well as other trackable replay information (e.g., ball flight and the like). This can also include adding any of displaying lines, alphanumeric messages, play metrics for player and team performance, etc.

Associated controls provide the ability to create shapes, colors, etc., to display any of initial, current, and final player paths and positions in a time sequenced, choreographed fashion (as further depicted in FIGS. 4-7). As will be further described in detail, the use of the various arrows and position identifiers is intended to show the player/object progressions or movements from an initial to final motion (ending) position.

The use of wirelessly communicating touch screen tablets, smart phones, ect., further enables such as a coach to draw in plays, routes, etc., such being replicated by the arrangement of light and intensity patterns displayed by the surface embedded components in order to provide either of training for the positional (training) player and/or to mimic the speed and route of the opposing positional player (either actual or supposed) and/or a path of travel of a game ball utilized during the play.

In this fashion, the system enables the ability to recreate, at a minimum, the positional/motion conditions associated with a play or time progression motion of a player, such at any speed up to or exceeding real time play conditions in order to assist in training the positional player under game play conditions and tempo. The additional use of sensor components (not shown however envisioned to be such as either embedded into the player's shoes or into the ground or previously described grid system) can be utilized in combination with the field embedded components in order to provide additional detail as to player positioning, orientation, and momentum (e.g., by measuring a pushing off force exerted upon the ground such as to assess player responsive motion or landing impact forces associated with the player falling or getting tackled to the ground).

It is also understood that, via the system management/control system, the full scale play progressions (of the lights and/or drones) for one or more player components can be rewound or backed-up in a step-like fashion, forwarded in a step-like fashion, resumed, slowed-down, speeded-up, have a segment repeated, etc. to enhance the learning process much like the controls on a video recorder device replaying a film. Additional features include the replay system supporting the running of plays from various origins, such as a designed playbook play, an actual recorded practice play, a recorded play from a previous game (e.g., using the IsoLynx recorded information), etc. In this manner, the individual components of a play (i.e., 1-n players involved in the play) can be run individually or together in a variable rate, time sequenced/choreographed execution showing "the play" evolving whether it is one player or the combined team's play execution.

Consistent with the above description, FIG. 11 is an exemplary and non-limiting illustration of one non-limiting illuminating array of individual and inter-connected light illuminating/sound emitting and sensor elements, see generally at 100, 102, which can be embedded into a turf or field surface. Each of these individual assemblies can include a body, 104/106, having any shape and terminating in a flush upper surface positioned and durable lens surface 108/110 which are incorporated into the embedded body.

The elements 100, 102, et seq., can be either individually or collectively powered and, additional to the sensor functionality of the individual lighting assemblies, such as which interfacing with any type of player worn proximity sensor (see strap mounted sensor 101 for player 94 in FIG. 9), other and additional sensor applications may include either or both of a pressure pad (see at 112/114) which surrounds the assembly body. In response to movement of the player with strap on sensor 101 across the field, the individual lighting elements may each integrate a receiving or input sensor 116/118 (these can also be utilized as motion responsive sensors to the player progressions) and which are built into the body and which can operating in unison with or separately from the pressure pads.

Also depicted at 120 and 122 are audial output (piezo transducer) speaker elements which, as previously described, can operate both with and independent from the light transmitting/illuminating aspects in order to provide a more realistic and life-like play recreation protocol. Additional to wireless protocols, also depicted is a wiring architecture, see interconnecting lines 124, 126, 128, et seq., for networking all of the individual illuminating elements. The present invention contemplates either or both of wired or wireless communicating protocols associated with the networking of the individual emitting components in order to provide real-time play progression representations in any of real (or speed adjusted) time.

FIG. 12 is an illustration of an alternate variant of a plurality of individual light/sound emitting and pressure sensing elements, see at 130, 132, 134, et seq. embedded within a semi rigid mat configuration, see generally at 136, which may be adapted to being placed upon a hard or semi-hard court surface (not shown) as an alternative to the individual turf embedded elements of FIG. 11. The mat can be provided as a continuous roll of material, as depicted at 138 in the non-limiting use variant of FIG. 12A, such also possibly including parallel spaced hinges 140, 142, et seq. to assist in storage/portability.

Figure 12A:
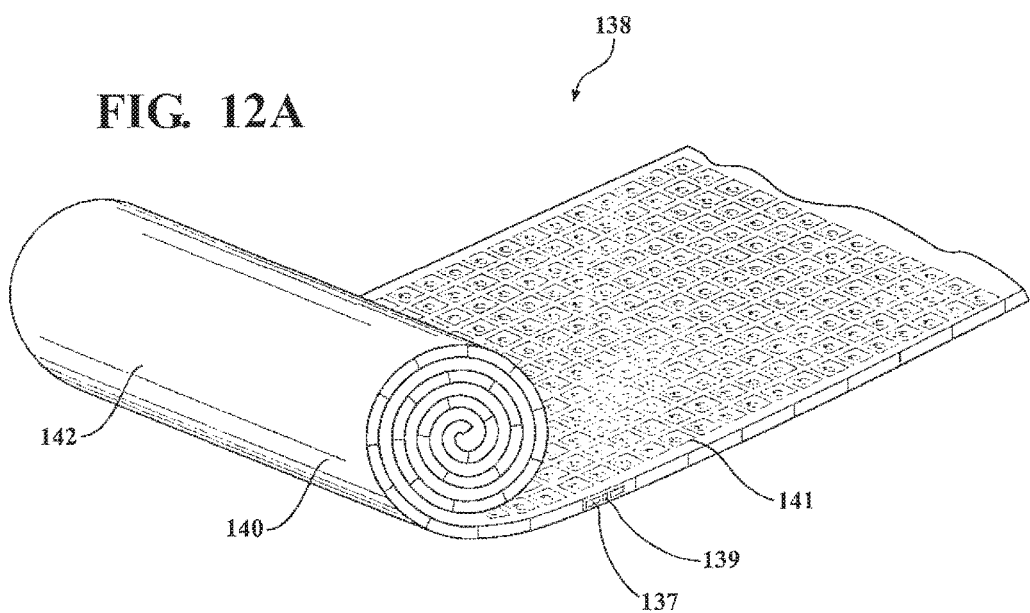
FIGS. 12-12B are illustrations of an alternate variant of a plurality of individual light/sound emitting elements, audio inputs/outputs, and pressure activated sensors embedded within a semi rigid mat configuration which may be adapted to being placed upon a hard or semi-hard court surface, the mat configured in either of hinge/rolled or segmented and interconnected form.
FIG. 12C-12D illustrate a further variant of a faux grass field depiction in which the lighting elements are substituted by segregated bunches of artificial and translucent/transparent grass bladed connected to a processor input/output associated with the control platform.
Figure 12B:
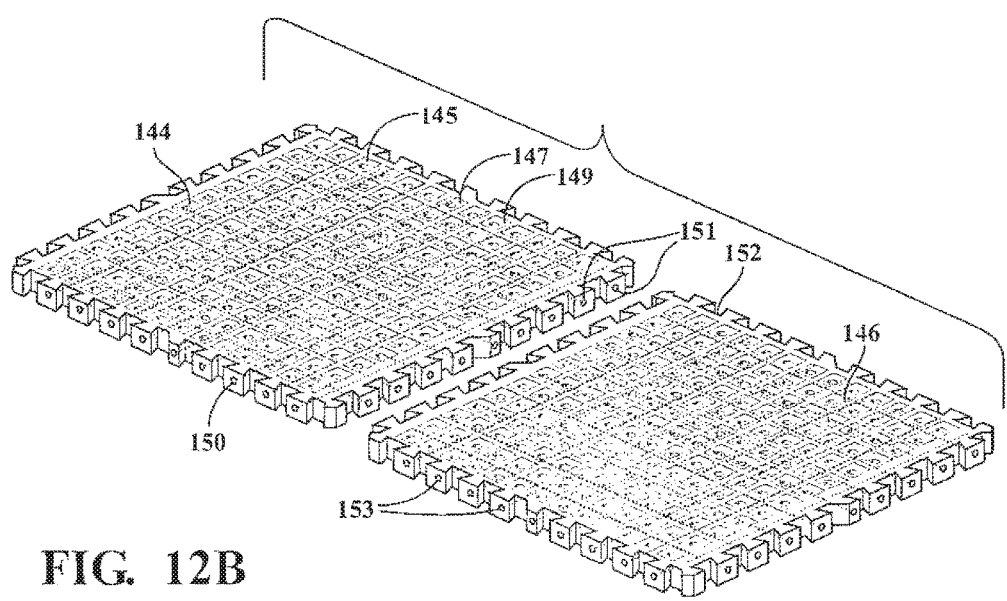

As further depicted in FIG. 12B, other applications include the mat being constructed of a plurality of checkerboard style inter-attaching polygonal/rectangular sheets (see at 144, 146, et seq.) or like three dimensional planar portions, each including a subset plurality of the individual emitting subassemblies. Extending and interconnecting edges of the individual three dimensional sheets can further include male/female or other interconnecting features (see at 150 & 152) to assist in interlocking the sheets together in a continuous playing surface and to further communicate the individual sub-pluralities of illuminating elements contained within each sheet (such including contact edge locations for an in-sheet wired network which interconnects the subpluralities of lighting elements integrated into each sheet, and so that the sheets can be quickly converted between a stacked/stored configuration and an interconnected and edge to edge assembled use variant.

Additional features can include the use of magnets, straps, underside adhesives or the like in order to secure the mat in place upon the underlying surface (such as a hardball court for basketball). Other variants not illustrated can further include integrating the lighting elements into a sub surface of a frozen ice rink and which operate with lighting elements sufficiently bright and cool to provide effective advancing light progressions to provide necessary positional training to the player/skater.

Figure 12C:
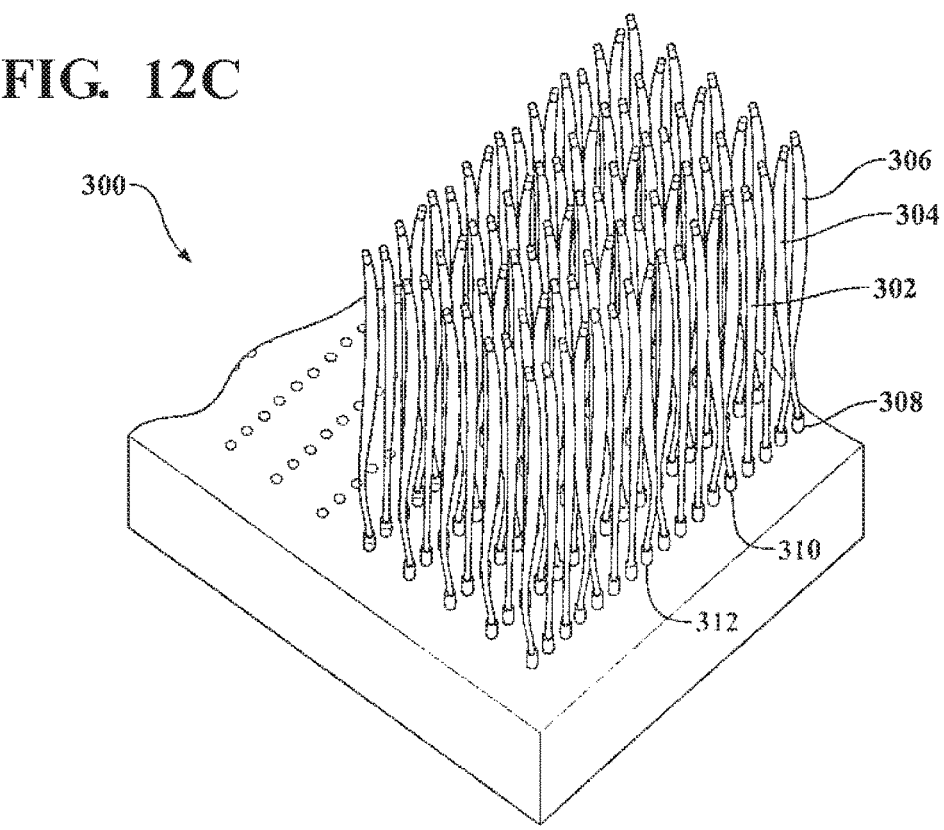
Figure 12D:
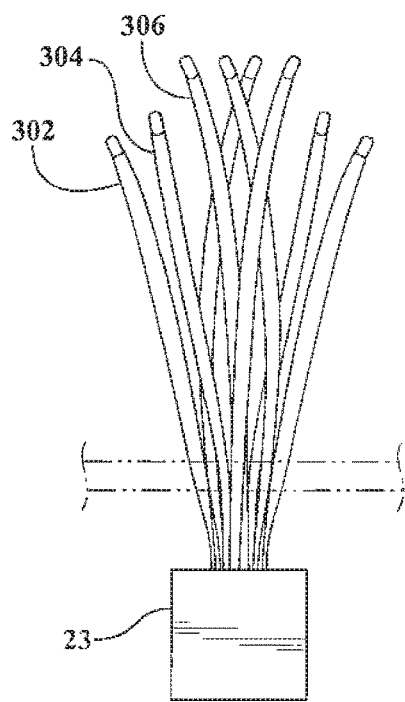

Furthermore, and as depicted generally at 300 in FIGS. 12C-12D, an additional variant depicts substituting the lighting elements previously described with a faux grass field depiction in which the lighting elements are substituted by segregated bunches of artificial and translucent/transparent grass bladed bunches (see at 302, 304, 306, et seq.) and which are connected to a processor input/output (again at 23) associated with the control platform. Suitable manufacturing processes could be employed for artificially producing sections of the turf with artificial translucent blade like materials, with suitable LED type elements being connected to a selected bunch of blades for feeding lighting patterns to the selective pluralities of the faux grass blades in order to provide the desired progressing representations.

With particular reference to FIG. 12C, it is further envisioned that the playing surface of non-limiting design, can include a microscopically arranged plurality of contact points or nodes (see at 308, 310, 312, et seq.), these each integrating an associated and microscopically sized LED emitter which is selectively activated according to any of the previously described protocols in order to illuminate the transparent/translucent and usually hollowed interior of the upwardly extending and artificially produced turf or grass blade, such further including provision of appropriately sized and individually formed fiber optic lines which create the faux like grass or turf appearance.

Incorporating the LED components into the playing surface (such as in recessed fashion) reduces the incidence of damage to these components if otherwise configured into the upwardly projecting blades. It is also envisioned that the fiber optic blade variant of FIGS. 12C-12D can, additional to the field design of FIGS. 2-3, be likewise integrated into any roll or grid attached mat or flat section configurations as shown in FIGS. 12A-12B.

FIGS. 4-8 depict a series of field representations, respectively at 26, 28, 30, 32 and 33 and which are understood to denote either or both of an actual on-field depiction of multi-player positions utilizing the lighting/sensor components of FIGS. 2-3 (and as further described in FIGS. 11-12B), as well as providing for a matching depiction which can be assembled and communicated by the components for transmission to a screen based display (e.g., again at 21 in FIG. 3) associated with a table or other monitor displaying processor device. As indicated in each of FIGS. 4-7, and with continued reference to a non-limiting example of a football type positional training variant, a legend of variables presented for each of these views (these interpreted as individual shapes projected upon the field grid display and due to the profiles projecting from the various illuminating elements), includes each of Offense Initial Position 34 (circle), Offense Motion (pre-snap) 36, Offense Motion (pre-snap) 36, Offense Movement (post-snap) 38, and Offense Ending Position 40. Additional variants include Defense Initial Position 42, Defense Motion (pre-snap) 44, Defense Movement (post-snap) 46 and Defense Ending Position 48. Also provided are representations for object (such as game ball) positioning and patterning such as resulting from being thrown by a quarterback. To this end, the digital representation of a game ball can include a physical ball being thrown by a player, with the object/ball integrating sensor tracking technology, state condition indication lighting/sound, etc. The present system also contemplates the ball being physically absent however its path or arc being digitally represented upon the playing surface lighting grid of elements time synced and sequenced with the play's other component progressions.

Figure 4:
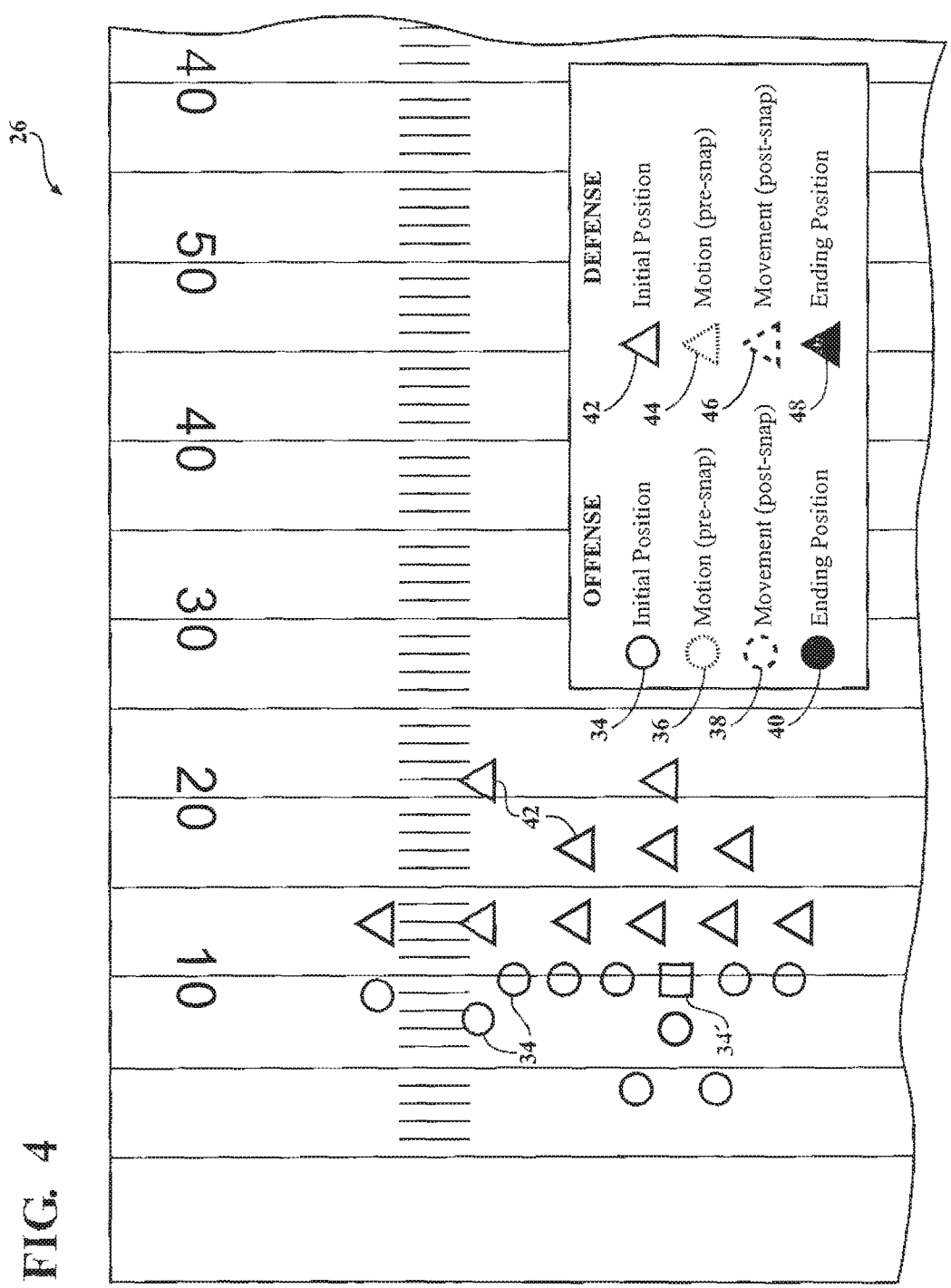
FIG. 4 is a pre-snap replay (on field and/or screen) representation of a light/sensor application with still position designations for both offensive and defensive player positions as well as any of initial position, motion (pre-snap), movement (post-snap), and ending positions.

Beginning with FIG. 4, a pre-snap replay (on field and/or screen) representation 26 is presented of a light/sensor application with initial position designations for both the Offense, again at 34, and the Defense, again at 42. It is also understood and envisioned that the depiction shown herein (again either broadcasted upon the physical field of play via the wireless controlled and communicating embedded light/sensor components and/or represented on a remote tablet or other processor controlled screen display) can represent any of a number of different conditions including initial player locations of a replay offense or defense that an opposing positional player(s) is playing against or an offense or defense replay without players.

As further shown, different shapes and/or colors can be projected from the illumination of selected groupings of the lighting elements (as well as represented digitally on the remote screen of such as the mobile tablet or the like) for depicting the offense and defense locations, player position or type (e.g., center, quarterback, guard, etc., in the illustrated variant), such as further depicted in the exemplary embodiment by blue solid circles for the Offense players (again at 34 and further depicting such as a center at 34') as well as orange triangular depictions for the Defense players, again at 42. It is also envisioned additional elements can be represented such as defensive zone scheme(s) coverage areas (see 89 in FIG. 9), information messages such as play name, etc.

Figure 5:
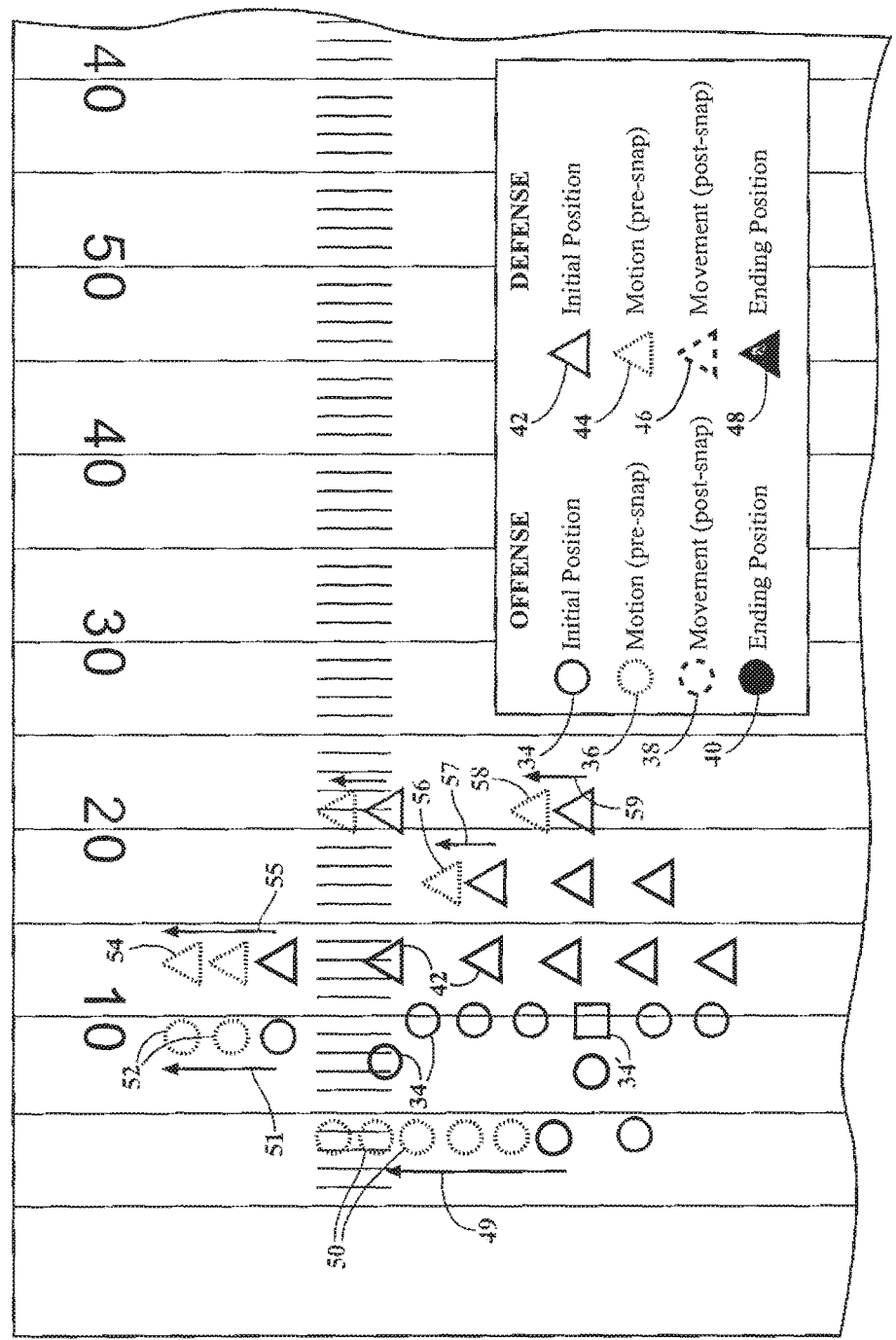
FIG. 5 is a related pre-snap time sequenced, choreographed motion depiction from FIG. 4.

FIG. 5 depicts a related pre-snap time synced and sequenced motion depiction, again at 28, in which the lights/sensors in the field of play additionally are selectively illuminated in given arrangements in order to identify a path of player motion (including shifts), this including arrow being shown at 49 for offense halfback 50 in motion and at 51 for offense receiver 52 in motion. Corresponding/responsive motions are further referenced by defensive cornerback 54 in motion (arrow at 55) and defensive linebackers 56 in motion (arrows 57), defensive safety 58 in motion (at 59). As described, additional functionality can include audio inputs/outputs (such as piezo transmitter integrated into the various field embedded components and/or an audio input/output feature integrated into the associated screen display program), such recreating a quarterback cadence, play audibles/changes at line of scrimmage (to test play change adherence) or the like as well as the audial soundtrack progression of the play with matches varied player motions as depicted by the movement of the player designated shapes along the networked lighting elements which correspond with the changing/progressing field position representations in real or speed adjusted time for the designed playbook play, recorded practice play, replayed previous filmed game, etc.

Figure 6:
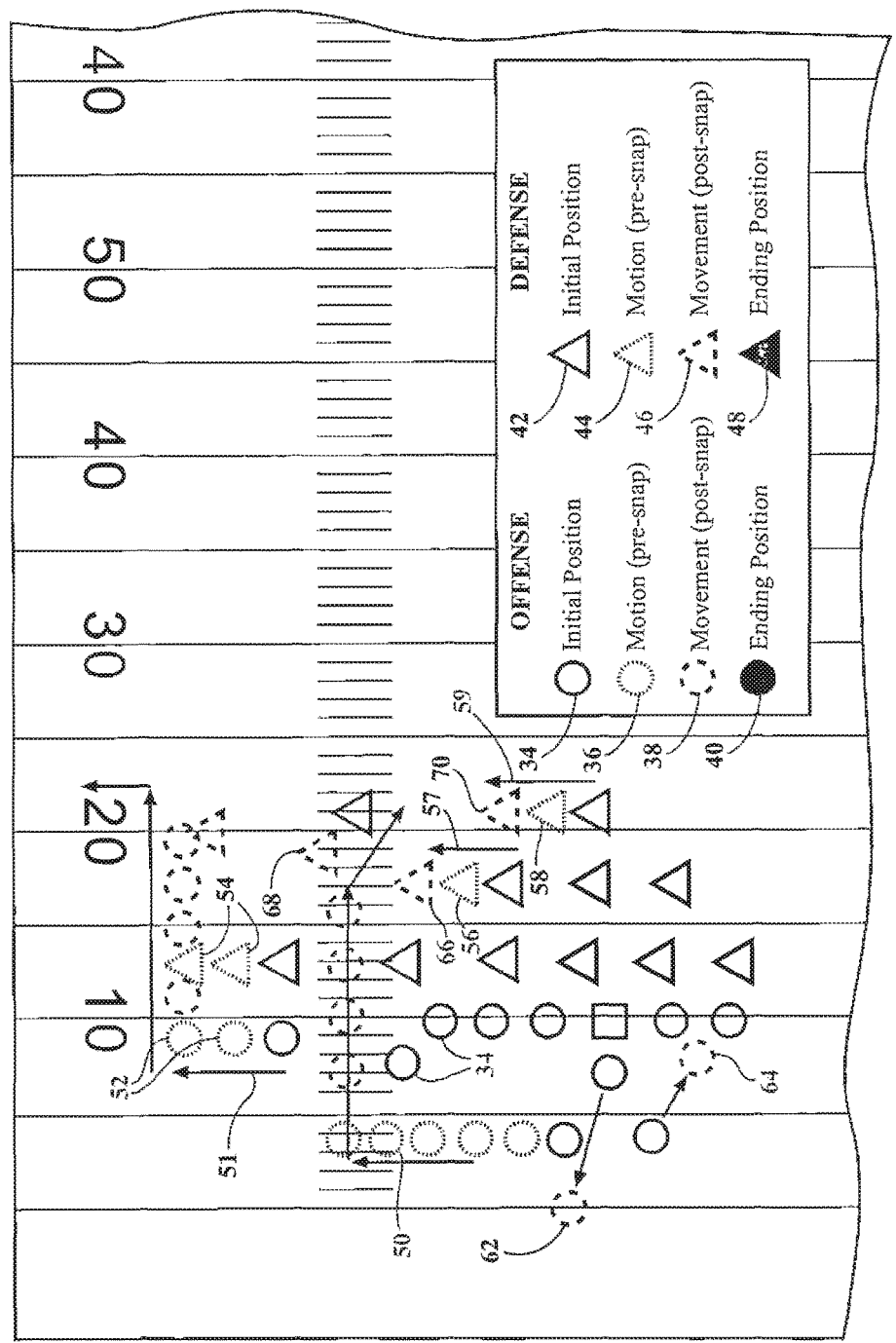
FIG. 6 additionally depicts post-snap movement in combination with initial position and pre-snap motions.

FIG. 6 additionally depicts, again at 30, post-snap movement in combination with initial position and pre-snap motions. This is reflected by offense post snap player movements 60, 62, 64, et seq., as well as (responsive)

defense post snap player movements 68, 70, 72, et seq., it being further understood that not all player movements are shown in the illustrated example and which can each include an accompanying directional arrow or be represented simply by the field/court illuminating progressions provided by the changing/advancing shapes, such as also including lines or lighted directional paths depicting the route and which are projected upon the field/court and/or on the associated remote device 21, such further offering configurability of line or shape style, color, thickness, blinking rate, etc. much like a Microsoft Excel line chart options. It is also envisioned that route progression rate or speed could further be visualized by thinner or thicker lines, line blink rates, etc. for varying player speed execution of a given play (e.g., slow first 10 yards and then accelerate after the cut point for the remainder of the play).

Figure 7:
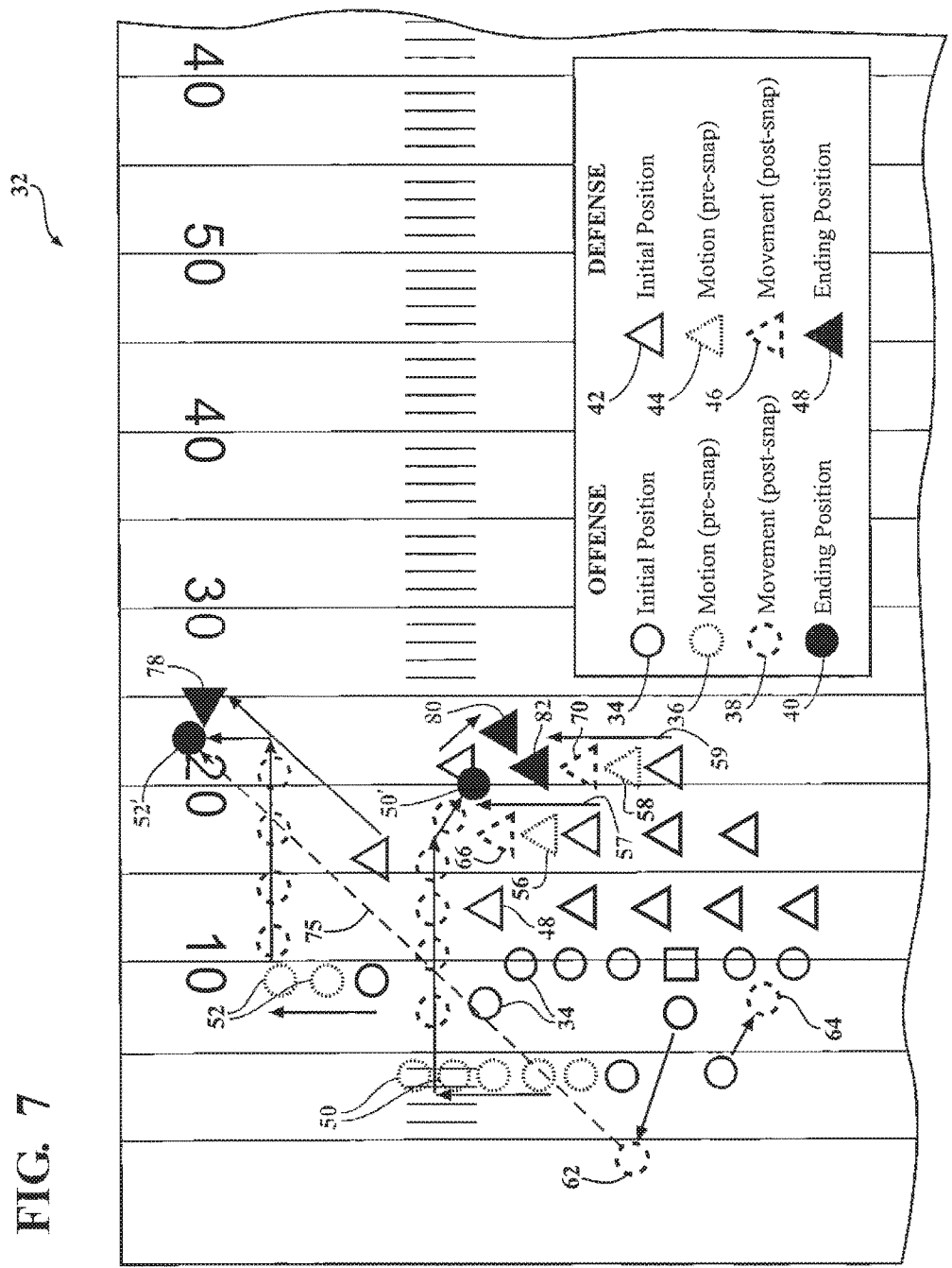
FIG. 7 is an end of play depiction of the arrangement of FIG. 4 and illustrating end of play positions associated with both blocking and receiving routes conducted by the offense in combination with a responsive depiction of a defensive secondary pursuit relating thereto and such as which can further include both ball flight motions and defense training against offense setups and vice-a-versa.

FIG. 7 is an end of play depiction, again at 32, of the arrangement of FIG. 4 and illustrating end of play positions associated with both blocking and receiving routes conducted by the offense, see again receiver at 52' for a ball being caught by the offensive player for ball thrown according to ball flight path 75, as well as at 50' corresponding to finish position for running/half back (see also at 50 in FIG. 6) at end of play position. In combination, a responsive depiction of a defensive backfield and/or secondary pursuit relating thereto is further shown at 78, 80, 82, et. seq.

As shown, the depiction of FIG. 7 aggregates the player position/motions (initial, pre-snap, and post-snap) in combination with the ending positions, along with the system tracking such variable as ball flight path (which can also be represented and such contemplating additional sensors contained in the game ball), ball caught (such as represented by change of color or intensity and/or by other audible representation), ball snapped, player off sides, etc. Other aspects include identifying and recording a player's response (such as in regard to an opposing offensive or defensive player) and in a use version in which a supposed offensive replay is defended by one or more actual defense positional players. In this manner, an associated software based program associated with the present system can provide for time synched and sequenced light/sound progressions of any number of offense or defense positional players in order to provide enhanced positional (i.e., non physical contacting speed and positioning) training of a player and without the necessity of all players being present on the field. The present system can further be modified to add or drop play running routes, motion paths, coverage areas/zones, and the like associated with any of the player positions on either side of the ball (offense and defense) and can be further modified in order to provide effective positional training to any combination of teammates or opposing players in the same simulation environment.

As previously stated, and utilizing the system management/control system described herein, it is further noted that the full scale play progressions (of the lights and/or drones) for one or more player components can be rewound or backed-up in a step-like fashion, forwarded in a step-like fashion, resumed, slowed-down, speeded-up, have a segment repeated, etc. to enhance the learning process much like the controls on a video recorder device replaying a film. Additional features include the replay system supporting the running of plays from various origins, such as a designed playbook play, an actual recorded practice play, a recorded play from a previous game (e.g., using the IsoLynx recorded information), etc. In this manner, the individual components of a play (i.e., 1-n players involved in the play) can be run individually or together in a variable rate, time sequenced/ choreographed execution showing "the play" evolving whether it is one player or the combined team's play execution.

FIG. 8 again depicts, at 33, a further positional play training illustration providing a depiction of play execution including all of individual, sub-team, full-team and play practice scenarios with individual game play, as well as diagramming of on field planned play execution, run play, routes or other motions with or without planned play highlighted on the field, and showing comparisons or actual vs. planned routes (which can be likewise represented in the illustrations) post play execution. Additionally, not shown in drawings, are defensive coverage areas/zones and analysis and metrics information in field messages which can utilize the lighting arrays to highlight zones and depict such messages including any of passing execution, late, wrong route, percentage of speed of play, etc., such information being viewable on tablet or other control devices as well.

The illustration of FIG. 8 further provides an explanatory illustration of a route which was not completed as planned, this clearly shown by directional arrows 63 and 53, and as opposed to an actual play execution representation arrows illustrated by designation 55 to player indicated start position 61, planned ending position 61', and actual end position 61". As such, the selected field representation of FIG. 8 clarifies that, for purposes of the given application described, the field designations presented in the solid line are intended to depict planned, designed, or intended play executions, such as again as to player start 61 and end 61' positions and intended ball or pass route 75 (all in dash), with actual play execution again depicted in hashed or varied field designations 63 and 53.

Additional aspects of the positional play training screen again include the ability to show designed play executions with dashed, blinking, solid, etc. lines, with additional identification metrics indicating such as play execution actual as opposed to planned (i.e., showing that the player didn't complete the route as planned). Other features include the messages displayed in the embedded field lighting and/or visual display device indicating any message or metrics, such in one non-limiting example reading "Replay—FAIL, 92%, 10% route variance, the translation of which being the object of the play was not achieved (e.g., the pass was dropped or missed by the receiver), the play was run at 92% of actual game play speed, and the receiver was 10% off his/her desired route.

As shown, the present system is not only a team sport replay and practice system, but it can also be used by an individual, a sub-team unit (receivers, linebackers, etc.), or the whole team to practice their own plays. FIG. 8 captures this aspect of the system and also is an example of how the replay system is able to be customized or reconfigured for application to other sports such as a gymnastic floor routine requiring timing, route tracing, etc.

In one exemplary scenario, the system and related computer readable medium includes each of the following aspects or features:

A player, sub-team unit, etc. needs to learn, practice, and be tested on the plays in their "playbook";

The system shows full scale plays (routes) to be practiced on the field of play;

The individual/position player can practice/run a route under different scenarios with the entire route lit by lights before the practice play starts;

Lights trace the route step by step, along with mechanisms to highlight route cadence, allowing the player or team to visualize the route(s);

Lights trace the route at partial or full speed, unfolding as the player does the play;

Lights can be controlled so as to run the play without any of the route lit perhaps after the player learns the play;

Lights highlight coverage scheme area and zone(s) a defensive player(s) is aligned to or responsible for coverage Upon completion of the training play, the field and the coach control device can show the planned vs. actual recorded route the player(s) just completed or an exemplary case for a defensive player did you adhere to the defensive scheme(s) responsibilities;

Analytics and metrics comparing the ideal or practice route could be calculated based on a number of foreseeable performance factors (e.g., a relational % difference of two routes, distance from actual vs. planned end point, actual vs. optimal player speed, play progression cadence differences, cut point execution, etc.), as well as providing each of all of a pass/fail/acceptable rating, a high-level metrics presented with the field light colors, blinking, or otherwise, illuminating in a desired fashion to create alpha numeric output values as feedback; and, in the case of a defensive player(s) example, analytics and metrics compare ideal and practiced alignment within a given scheme (e.g., stayed in zone, missed assignment, separation distance exceeded).

Figure 9:
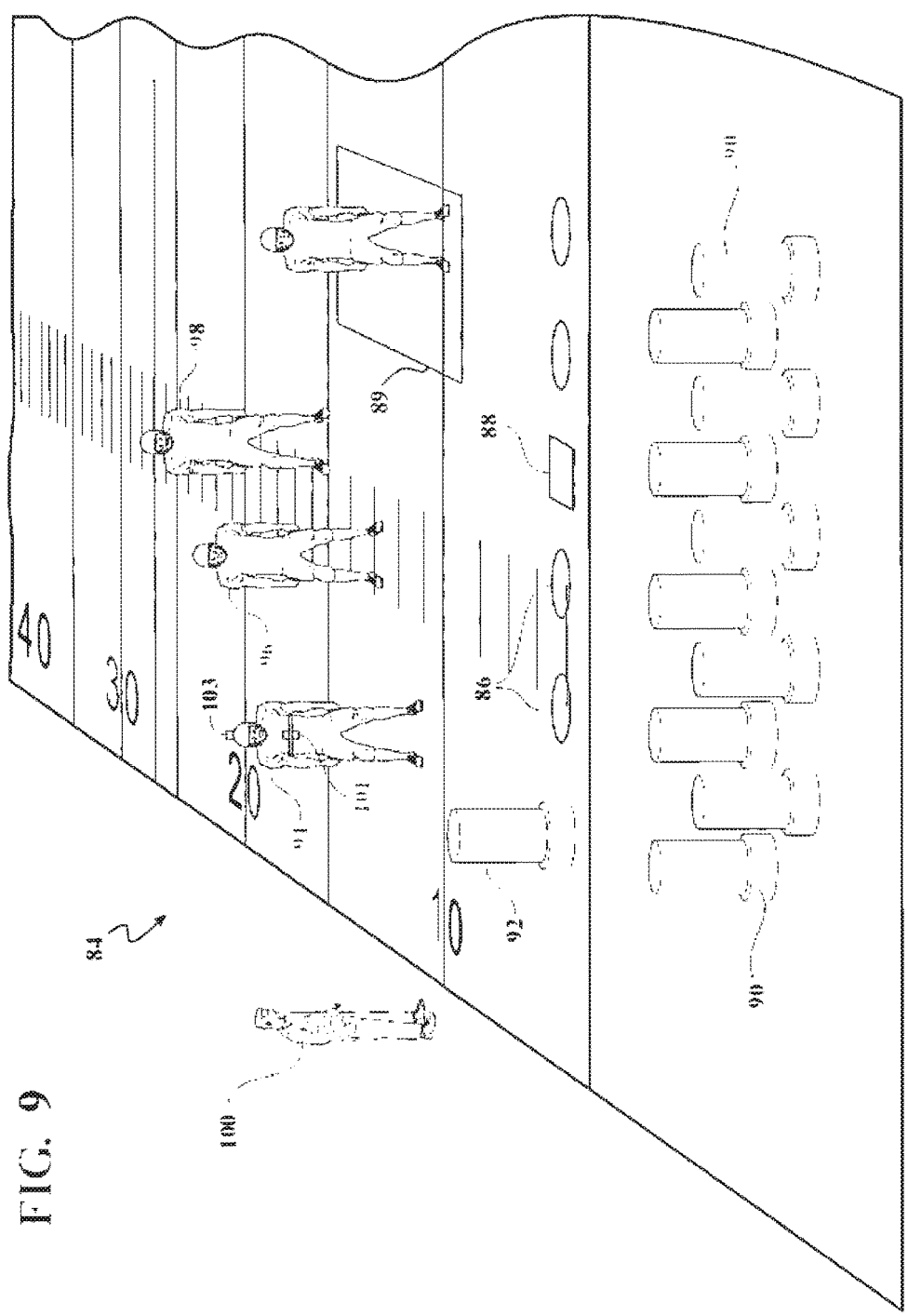
FIG. 9 is an illustration of a three dimensional variant of the present inventions and which also includes an arrangement of 2D lights/sensors in combination with any number of programmable robots/droids mimicking opposing positional player attributes and positioning during execution of play, and to assist in training the practicing player(s) in terms of technique, positioning, speed, etc.

Proceeding to FIG. 9, an illustration is generally shown at 84 of a three dimensional variant of the present inventions and which also includes an arrangement of 2D lights/sensors (such as shown in FIGS. 2-3 and as depicted by on field or on screen lighting designations 86, 88, et seq.) in combination with any number of programmable robots (such term also hereinafter interchangeably used with either of droids or drones), see at 90 and 92 and which are positioned relative to a collection of on-field practicing players 94, 96, 98, et seq. The robots 90/92 are of a suitable construction and can be integrated with a servo drive which is processor controlled and in turn responsive to inputs (such as associated with the operational program controlling the illuminating field/court advancing light patterns) and such that they are able to simulate position actions of a given player, such as a quarterback (e.g., including replaying an auditory called play audible, such as to test play change adherence, throwing a ball like a pitching machine), or an entire unit or team being on the field when multiple droids are used to execute a play.

As will be described with additional reference to FIGS. 15-17, the use of droids is understood to be multi-dimensional and can include in one non-limiting application being provided as a component of the present grid based lighting represented player training system. Additional applications, as will be further described, also include the droids being utilized separately from the playing surface integrated lighting elements, and such as which can be programmed in any of individualized or plural/choreographed fashion by the associated control platform in order to provide another variant of team or individual player position training.

As will again be described with reference to FIGS. 16-17, the droids can also be configured so as to be able to discharge or throw a ball such as is accomplished by a pitching machine or to hand-off the ball (or receive a hand-off). It is also understood that, additional to the strap worn sensor 101 for any given player (94) any of a body or helmet mounted camera (see further at 103) can be provided which also interfaces with the remote process 23 and which provides an additional recordable or playback digital file associated with the full scale training platform.

Referring further to FIG. 10, a representation of the robots/droids/drones 90, 92 of FIG. 9 is again provided, combined with the light representing player positions of FIGS. 4-7, such not being repetitively identified however it being understood that the robots/droids/drones 90/02 are capable of being provided in combined fashion with any number of lights or lighting designations 86, 88, 89, et seq. such as further which can represent additional players to those recreated by the droids/drones, again with all of initial position, pre-snap motion, post-snap movement or ending positions. The on-field light grid as also previously described can be programmed additionally represent routes, any of ball thrown/thrown ball positions, ball flight directions and the like.

The droids or drones 90/92 (which shares some attributes and functionality with the prior art Dartmouth droid disclosed in the background section) can also be programmed, through appropriate wirelessly communicable processor and servo construction (see again process 23) interfacing with the associated operating software program, in order to move at speeds up to (or in excess of) real time according to a given play development, to simulate pump fakes, etc. Additional aspects of the droid/drone design, such as again further referenced at 92, can include such mimicking the actions of key positional players (or all players on a given team), can recreate or trace routes (such as a wide receiver according to the previous illustrations), can incorporate lights, sounds, etc., in order to simulate status or situational (e.g., in motion, ball in-flight, ball caught, and ball handed off) conditions. As will also be described in additional detail, the droids each include a drive and operating mechanism such as depicted by non-limiting example in the Dartmouth MVP player hardware assemblies and which can be further configured according to the present inventions to operate in time synched, choreographed manner via a communication profile with the control platform including without limitation any of WiFi, Bluetooth, Bluetooth Low Energy, ZigBee, ANT, NFC (Near Field Communication), or the like.

The droids/drones can further be programmed, such as again through their associated servo and drive controls, to operate at any fixed or variable speed (e.g., 90%, 100%, 110%) of player or play speed under given game conditions and which, in combination with the positional player progressions associated with the various illuminating depictions, provide an additional realistic aspect to the training protocols. As with the Prior Art described Dartmouth droid design, the robots/drones 90/92 provided herein are capable of being tackled and automatically upright reset, and these can further be integrated with additional sensors for measuring force and timing of the tackling (e.g., too early, too late). The associated reset or return feature built into the robot/drone construction can further provide for return of the robot/droid to an initial starting position prior to initiation of a succeeding play.

In this fashion, and upon combining the various aspects of the robots/droids 90/92 with the arrangement of the additional play/route/player light representations 86, 88, 89, et. seq. (see again FIGS. 2-7), the training or practice team/players 94, 96, 98, et seq., are repetitively trained to learn plays, with the associated controlling software module recording how the players respond to a given recreated or replayed play, including measuring reaction time and instructing as to a desired positioning and orientation of the training players relative to themselves or the supposed opposite team (again represented by the robots/droids 90/92 and the field light representations 86, 88, 89, et. seq. It is further understood that, in the representation shown, not all players on a given side are necessarily depicted and that one or more training team/players could be arranged to play/train against and number (1, 2, . . . 11) robots/drones 90, 92 representing a play recreation simulating an actual play run by a team in game conditions. As described, the play recreation can be general to an entire training team or can be tailored to a given positional player being trained, such as further by restricting to the movement of certain robots, lights, etc.

Other related aspects include the system and computer writeable media being programmed to replay a prior recorded game series, such as to run in sequence with exact timing between plays (e.g., first series, no huddle sequence or simulation). The control platform can also show performance metrics, including high level metrics which can be displayed upon the field with embedded lights showing alpha-numeric values.

Also shown is a coach input device, at 100, which can again include any of a tablet or other processor driven device (such as including a touch screen) for displaying the on field conditions. Additionally functionality can include the ability of the coach to run plays, i.e., to direct the action of the field lights 86, 88, 89, et seq., and to choreograph the operation of the robots/droids 90, 92 via the touch screen table (e.g., such as by choosing a play from an inputted or loaded playbook or game history library/database or drawing or tracing on the touchscreen a desired positioning, route, speed, etc., of the lights and or robots). Additional software based subroutines or protocols can include automating a series of plays (such as over a series of downs in the football variant or perhaps a longer series of plays over an entire quarter). In this fashion, the coach can control the performance parameters of any of an entire recreated team (lights and/or robots), as well as perhaps only (in the instance of a training defense against a supposed recreated offense) limited portions thereof including the receivers only, offensive line, and/or individual players (quarterback, running back, etc., for the opposite side (training players) to practice against.

As again previously described, the system combines both embedded durable lighting and sensors, which can be associated with each of the positional players as well as the field of play. The lighting can be color controlled to each of the individual and or the positional relationship (such as including route tracing), and the sensors may include readout capabilities for any one or more of speed, force of contact, foot pressure or the like. To this end, visual indicators of events can include flashing or color changing of the selected lighting patterns, such as in order to designate player paths, routes, route outline, current location, route development, ball flight, etc.

Additional functionality associated with the software module or component extra space includes the ability to record past plays as well as to assess an opposing side response. Replay speed can be calibrated for variations ranging between incremental, slow, full or higher speeds. Player location and route comparison modules further provide for metric comparisons (e.g., speed, location, relative location to others, timing, cut points, cadence, response time to ball throw, etc.).

The system components of the present invention also include, in addition to the durable sensors and lighting components, a control platform integrating the software component, such as which can be integrated into a wireless communicating and processor driven hand-held tablets or other audio visual device for collecting and displaying the performance parameters associated with the positional player and team or unit of players.

The robot integration subassembly (see again Dartmouth disclosure) may also be included for assisting in 3D simulation plays, including such speed control, location, reset and return to initial or next formation, hold lineman, etc. Other player integrated aspects include such as shoes incorporating radio frequency identification (RFID) tags, and pressure sensors for recording positional tendencies.

Other associated hardware components can include the game play ball (e.g., football, basketball, soccer ball, baseball, hockey puck, etc. depending upon the variant) integrating either or both of the lights and sensors which can be further calibrated to designate a given act or occurrence not limited to the ball being handed off, being in flight, being caught, etc. The use of the various light, sensor, accelerometer, and other input components can also be selectively employed such as to track specific practice or game play parameters, i.e., the speed, arc and/or trajectory of the ball, the desired versus actual route run by the receiver, and the corresponding coverage route of the defensive back (football variant). Such can also include feedback metrics for instructing when the positional player is too close, too far away to defend well, and/or is located correcting in the zone defense established by an initial set of game play parameters.

Other advantages of the system include the ability to assist in team development of the various players and in particular of the team practice squad players who usually are not provided the ability to train against or otherwise simulate the speed and precision of the opponent (starting) team. This also assists in player development in order to both train and measure ability against higher level talent and potentially recruiting and draft selection activities.

Other envisioned variants can include the provision of hardware dummy robots, such as which can include a return home function for next play capability. Other aspects include additional types of input sensors for feedback capture for determining such incidences (football version) as early/late tackling relative to a catch, pushing off at the line, release, etc.

Other variants can include embedded cameras within opposing player helmets or uniforms, such as for providing image or video capture. The opposing players can further be outfitted with additional sensors for tracking and or all of impact, accelerometer, location, etc.

Additional features can include depicting the players in different colors as dictated by speed/motion, such as including in one non-limiting instance depicting a pre-snap (football version) with a given color/sound designation, such as which can be changed upon a snap/hike event. Other algorithmic aspects of the system and associated computer readable medium can include illustrating each of player defense/offense schemes, including where the player is or should be located and where and how fast the positional player should move once the play has started. Other aspects can include integrating a quarterback voice and cadence (again football version) to better provide for game play simulation, as well as the ability to record defense positional setup (locations) against the play being run or simulated.

As will be further described, and without limitation, variations of the present system, process and computer readable medium can be modified to operate with any team based sport again not limited to any of football, baseball, basketball, soccer, hockey, rugby, tennis or the like, each of which providing variations of sensors or other embedded inputs which, in combination with a given software module and any other hardware inputs, can provide for a variety of positional training aspects, such again intended to provide game play real time speed simulation for all players, including lower string and practice squad players who may not otherwise have the ability to practice or train in person against top level opposing talent. Other envisioned applications can include other non-sports related uses, such as training in dance, gymnastics, marching band or other motion based training regimens. It is also envisioned and understood that the interactive nature of the individually programmable lights/lighting elements, can be configured to provide holographic style images and or to be interconnected in a way consistent with developing "internet of everything" technology in which the individual plurality of grid-style embedded lighting components can be programmed with additional adaptive or self-learning protocols to further assist in the recreation of life-like game training conditions.

Figure 13:
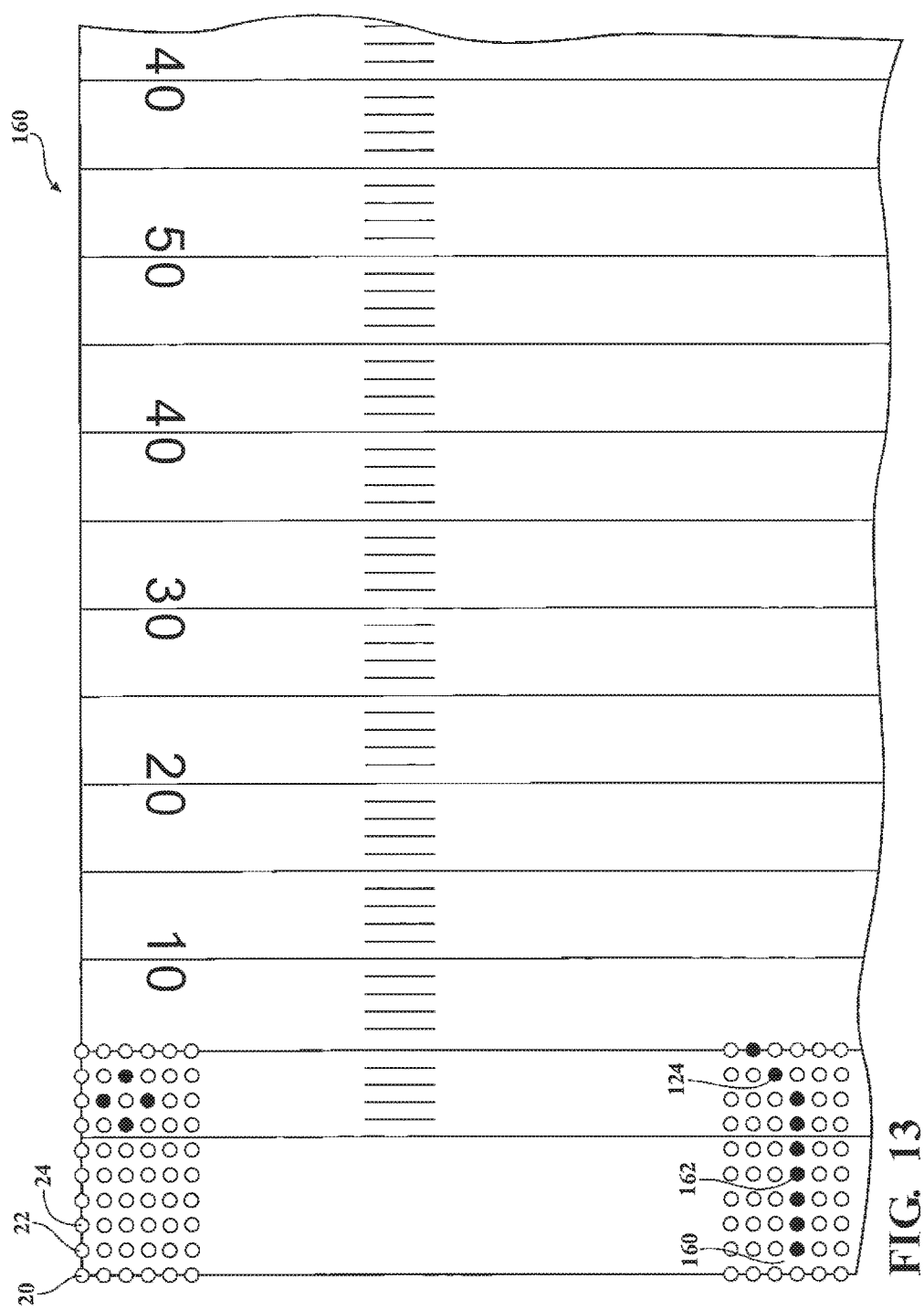
FIG. 13 is a further detailed field of view play similar to the representations of FIGS. 2-3 and illustrating a variety of additional configurations made possible by the present invention, such including varieties of additional multi-colored lights patterns and progressions associated with the game play simulation options provided by the present system, such further including individualized designations for showing ball movement, route and speed along with rapidly progressing/changing representations for any of a variety of player movements, as well as the use of any of embedded pressure switches, near field sensors, audio sensors, and the like for measuring and tracking a practice player's response.

Consistent with the above explanation, FIG. 13 is a further detailed field of view play 160 similar to the representations of FIGS. 2-3 and illustrating a variety of additional configurations made possible by the present invention, such including varieties of additional multi-colored lights patterns (see again at 20, 22, 24, et seq.) and progressions (as further shown at 160, 162, 164, et seq.) associated with the game play simulation options provided by the present system, such further including individualized designations for showing ball movement, route speed and changes, as well as embedded pressure or near field sensors for measuring and tracking a practice player's response.

As stated, the embedded lights, sensors and the like can be integrated into an entire field of play so as not to be disruptive to the training players and other participants. The lights can be multi-colored as well as independently controllable (such as which will be additionally described in reference to the example of the control platform operating software in FIG. 15). Additional to the previously disclosed functionality of the progressing light patterns, these again being individually and collectively in a time progressing fashion showing progressing motion on the field surface, as well as showing any or all of lines, shapes, etc. representative of player location, movement, etc., the lighting elements can be additionally varied in number and intensity, again in time advancing fashion, for also providing varying cadences and routes (see as will be described at 170 in reference to FIG. 14).

The density illumination and accuracy level required for a given sport or event can be varied as required for applying a player position, movement or other required replay information (e.g., ball flight). The associated control platform can further be connected to the field lighting elements in order to control the creation and projection of shapes, colors, etc., again such as with the objective of depicting each of initial, progressing and final player paths and positions. Additional features again include the ability to depict each of ball flight, offense and defense positions, etc. The pressure or near field sensors discussed in FIGS. 11-12 further provide the ability to better measure a practicing players response to the program to lighting element generated field conditions.

With further reference to the advancing player light progressions 160, 162, 164, et seq. in FIG. 13, it is again understood that the displayable shapes and lines are further configurable for establishing any or all of player progressions (shown again via shapes or lines), as well as the style or shape of symbols progressing in real or (slowed or speeded up) time upon the lighted practice surface. The speed of phases of progression (reference again to cadence changes in FIG. 14) can be further represented by any of line thicknesses, blinking rates, changing colors, line styles (compare to Excel graphs or charts). The control platform software further provides the ability to provide player review projections (either on the actual playing surface field or represented on the digital device screen display) these again being in any of highlighted, blinking or other representations not limited to those depicted herein. Object ball movement, as previously described, can again be depicted in the same fashion.

Referring again to FIG. 14, an additional detail field of play view is shown at 170 and which illustrates varying player progressions, with varying route component speeds and cadences, using different shapes or lines, such being depicted by changing line progression thicknesses (intensity and number of progressing lights being illuminated), blinking intensity, changing colors, and with different player routes further being represented or distinguished by different colors, a replay of such routes further being envisioned as depicted by any of highlighted, blinking or other representations.

Figure 14:
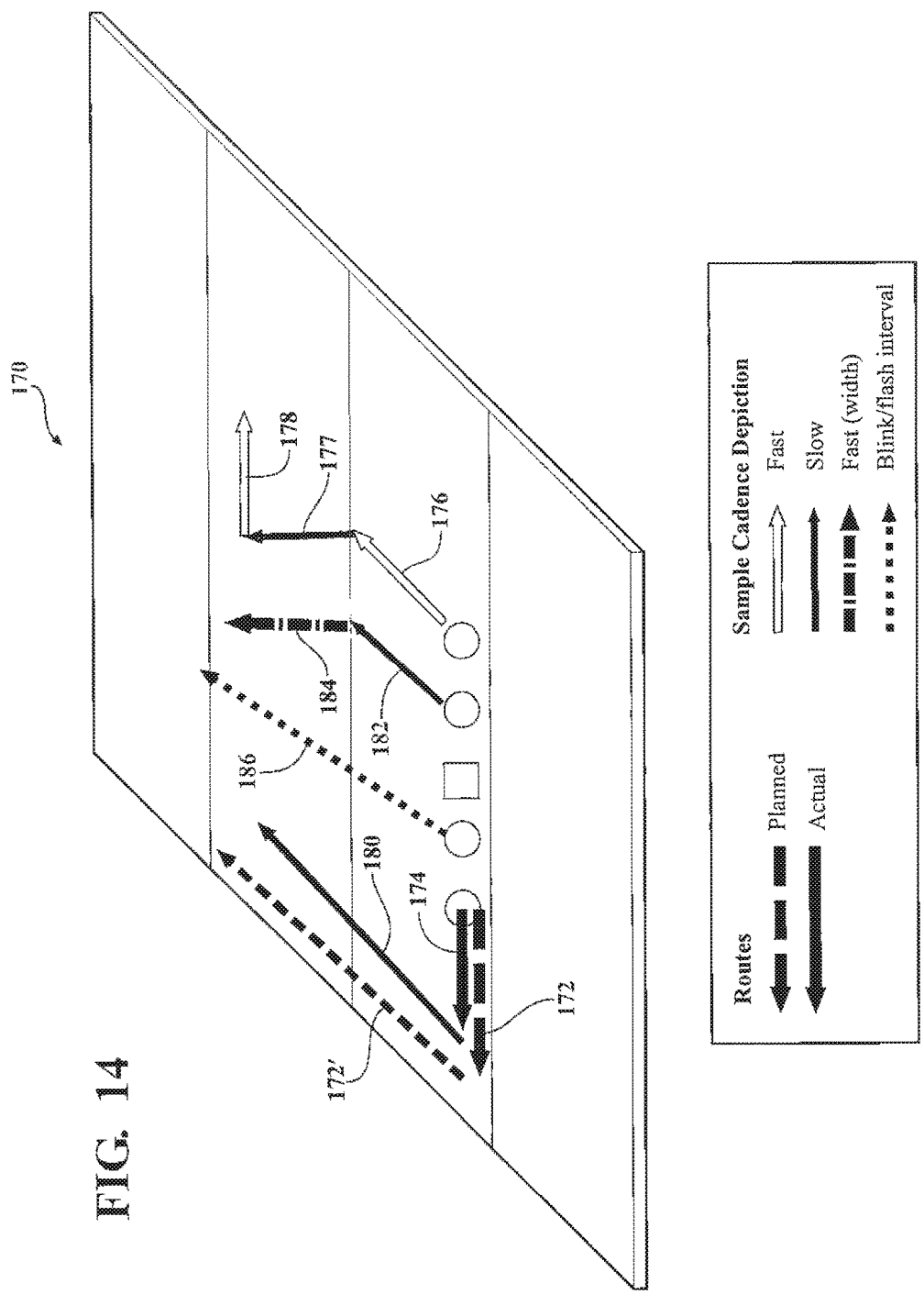
FIG. 14 is an additional detail field of play view which illustrates varying player progressions with varying route component speeds/cadences using different shapes or lines, such being depicted by changing line progression thicknesses (intensity and number of progressing lights being illuminated), blinking intensity, changing colors, and with different player routes further being represented or distinguished by different colors, a replay of such routes further being envisioned as depicted by any of highlighted, blinking or other representations.

FIG. 14 further depicts these options including, in one non-limiting example of the associated control platform and operating/communicating software providing such representations, both of player planned route (see hashed line representation 172), along with a series of actual player routes (these further depicted at each of 174 and 180 for a first player representation, at 182 and 184 for a second player representation and at 176, 177 and 178 for a third player representation. As further shown in the accompanying legend, the actual routes (174/184) can be wider in path or intensity to represent a faster cadence or tempo, with narrower representations (180, 182) representing slower speeds or tempo. The planned route further can include a slower cadence component 172 and a faster component 172'. Additional (red) colored depictions at 176 and 178 alternate with a slower cadence motion 177 for a given player representation and in order to provide a more life-like and playing surface generated depiction of a player motion associated with a selected game play scenario. Also depicted at 186 is a blinking flashing interval designation such as which can denote a ball delivery pattern or other player/object motion designation.

Figure 15:
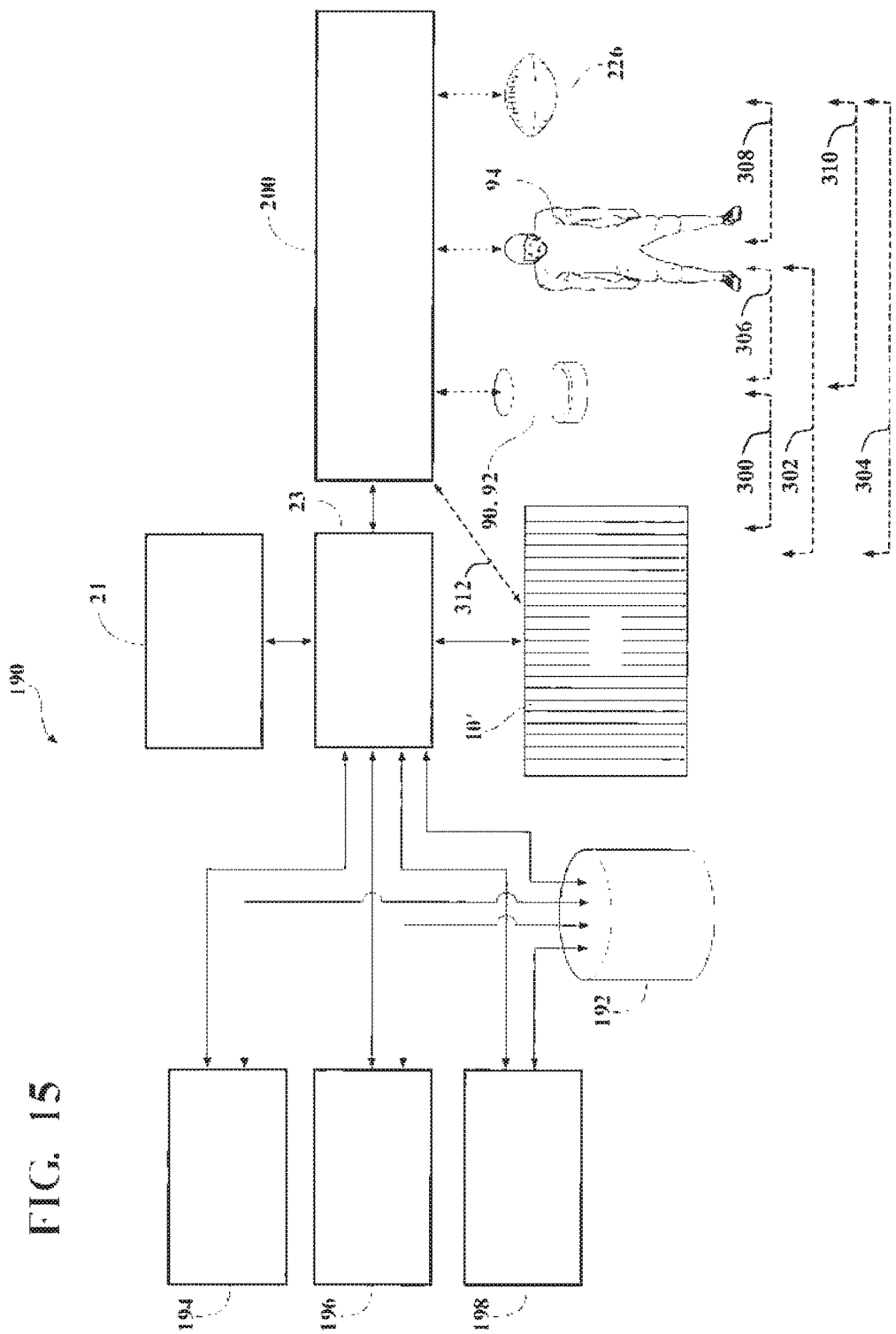
FIG. 15 is a diagrammatic illustration of a system software setup associated with the control platform of the present invention.

Proceeding to FIG. 15, a diagrammatic illustration is shown at 190 of an exemplary system software setup associated with the control platform of the present invention, such including the microprocessor 23 and external system interface (laptop/tablet) 21 in relation to the lighting grid playing surface 10' depicted in FIG. 3. Aspects of the control platform, as previously indicated, can include a separately accessible database 192 for interfacing the microprocessor/controller 23 with each or all of a player information database 194 (such as via a cloud storage application which provides access to all relevant player data and other inputs), a video footage input 196 (e.g., such as an IsoLynx system as known in the technical art), as well as any other desired input system 198.

Also depicted at 200 is a communications protocol entitled Inputs/Outputs/Communications/Positioning, such again not limited to any of direct wired communication to at least the embedded lighting elements, but also envisioning any one or more of WiFi, Bluetooth, Bluetooth Low Energy, ZigBee, ANT, or NFC (Near Field Communication) protocols. Also shown interfacing with communications protocol 200 is each of a drone 90 or 92, a player 94, and a sports item or article (see football 226 as further described in FIG. 16D). It is again noted that the representation of FIG. 15 is intended to provide one non-limiting example of a software driven operational protocol for integration into a control module for accomplishing each of real time and progressing lighting (player or ball motion) depictions on the desired practice field, in combination with providing matching depictions on the screen display of the connected processor driven device (again any of mobile phone, laptop 23, or digitally and processor enabled large viewing screen which can be communicated with the system via the applicable network 200).

As further noted, the communication protocols between each of the field surface 10', drones 90, 92, et seq., practicing player 94 and game ball 226 can be varied beyond the core communications occurring between the control platform process and those integrated into the drones. This can include additional dedicated communications streams between any pairing of the above as noted by dedicated protocol designations 300, 302, 304, 306, 308 and 310, this additional to the remaining directional protocols indicated between the other various components of the system. As further shown at 312, processors and sensors integrated into each of the field 10' and communications protocol 200 can also communicate directly with one another.

FIG. 15A is a further illustration, generally at 191 of a more detailed representation of an exemplary system management architecture associated with the control platform of FIG. 15, such providing additional detail as to each of interface, processing and field/device components (see further at 25) associated with the present invention. Additional features of the system interface component (also shown at 21 in each of FIGS. 3 and 15), include provision of a play creator/builder, such providing each of video input and edit, sketch input and edit, scanned input and edit, and electronic input and edit.

A play cataloger sub-component (also termed for purposes of this description to include any appropriate subroutine or algorithm) includes the ability to segregate, in one non-limiting application, by each of teams, players and games. A play execution/trainer provides each of play selector and sequencer, play phrase timing manager and players/sub-units designations. A further player management component further provides for the ability to track data by performance history, play history, and characteristics and capabilities.

The associated control system component (again at 23 in FIGS. 3 and 15) teaches managing the interfaces with both system inputs and outputs. As previously described, this further includes managing interactions and coordination/synchronization of the subsystem components, these including without limitation any one or more of lights, sensors, players, drones, or other devices.

As further schematically designated at 193, the subsystems of the processing component further include a catalog of functionalities, these including each of:

Player(s) Management, including each of location and data capture;

Grid (field light/sensor) Management, including inputs/outputs and data capture;

Drone Management, including each of movement, lighting, and data capture associated therewith;

Device Management, including each of movement, lighting, and data capture associated therewith;

User Interface, such as including any of a computer, tablet, phone, or other voice control component;

Light and Sensor Management including any of capture/acquisition, rendering, and storage; and Analytics for providing any or all of a play comparator and play/player analyses.

Additional aspects of the field and devices (this drawing on the teachings and illustrations of FIGS. 2-14) includes the following additional aspects and capabilities:

Inputs and Outputs (field/display), such including light management and play rendering, text, audio, and sensors;

Inputs and Outputs (player, devices, and drones), including but not limited to microphones, sensors (e.g., pressure), speakers, lights, accelerometers, etc.;

Player/Device/Drone positioning, including each of tagging, grid location, etc. using WiFi, Bluetooth, ANT, RFID, Bluetooth Low Energy, ZigBee, NFC (Near Field Communication) etc. protocols;

Via the system management/control system, the full scale play progressions (of the lights and/or drones) for one or more player components can be rewound or backed-up in a step-like fashion, forwarded in a step-like fashion, resumed, slowed-down, speeded-up, have a segment repeated, etc. to enhance the learning process much like the controls on a video recorder device replaying a film.

The replay system supporting the running of plays from various origins, such as a designed playbook play, an actual recorded practice play, a recorded play from a previous game (e.g., IsoLynx-like recorded information), etc. In this manner, the individual components of a play (i.e., 1-n players involved in the play) can be run individually or together in a variable rate, time sequenced/choreographed execution showing "the play" evolving whether it is one player or the combined team's play execution.

Without limitation, the functionalities listed in FIG. 15A are non-limiting as to any specific application of the present inventions, it being further understood that the devices referenced can also be provided as activity-related components, accessories, etc., such as footballs (in a football training application), baseballs (in a baseball training application), or such further tailored applications utilizing such as basketballs, soccer balls, hockey pucks, without limitation.

Figure 15B:
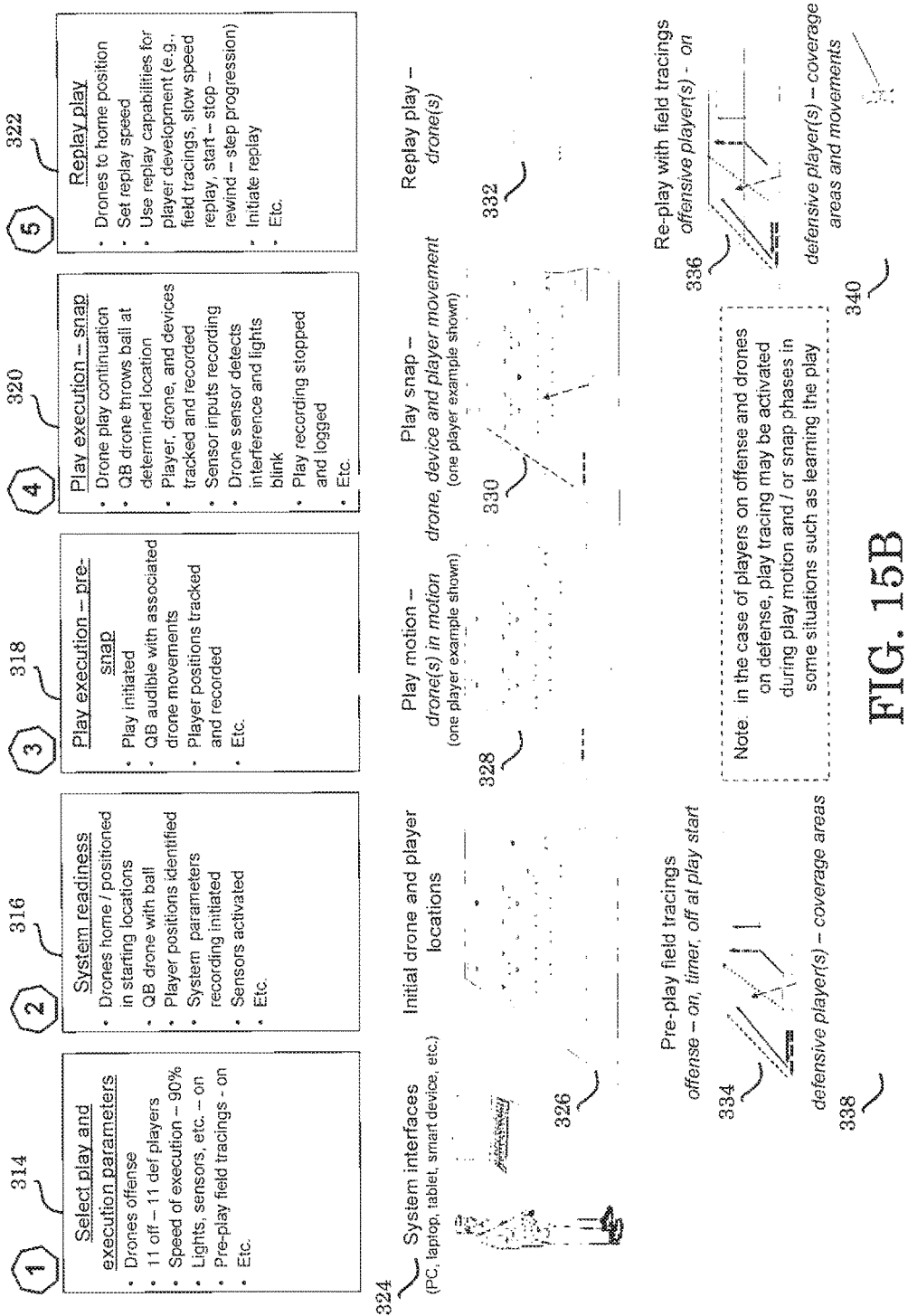
FIGS. 15B-15F provide an exemplary play execution module using the Drone Management System along with further illustrations and detail of the control platform sub-components, such including each of Play Builder Module, Player Cataloger and Management System, Play Scriptor/Trainer, and Play and Replay Drone Controller.

FIGS. 15B-15F complement the drone management architecture of FIG. 15A and further illustrate a series of module protocols according to non-limiting variants of the present invention. FIG. 15B illustrates an Exemplary Play Execution protocol which provides for each of play selection and execution parameters 314, system readiness 316, play execution/pre-snap 318, play execution/snap 320, and replay play protocols 322.

Additional subset representations include System interfaces (at 324) such as PC, laptop, tablet, smart device, etc., initial drone and player locations (at 326), play motion designations (at 328), play snap designation (at 330 designating any or all of drone, device and player movement), and replay play designation (at 332). Additional designations reference each of pre-play field tracings (at 334), replay with field tracings (at 336), defensive player(s) coverage areas 338 and defensive player(s)—coverage areas and movements (at 340). As additionally noted, the play tracing function can be modified in the case of practicing players on offense and drones on defense, so that such tracing is activated during play motion and/or snap phases in some situations such as associated with instructing or learning the play.

Figure 15C:
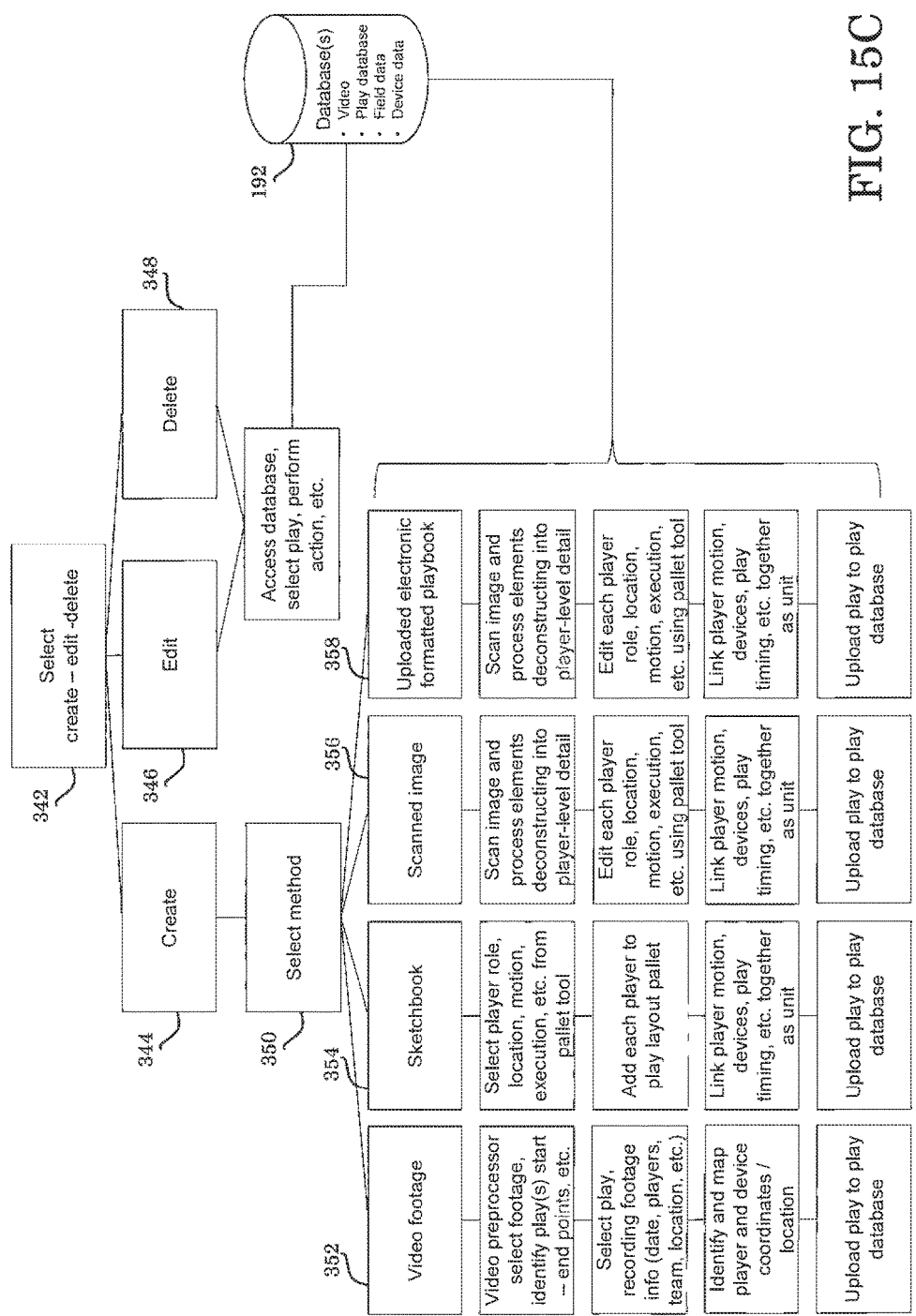

FIG. 15C depicts an exemplary play builder module utilizing the database 192 from FIG. 15A, this providing a menu for uploading a constructed play, utilizing any one or more of video footage, sketchbook, scanned images and/or and uploaded electronic formatted playbook. This includes initial Select 342, create 344, edit 346, and delete 348 steps. Create 344 step progresses to a select method 350 step, from which can be designated any of video footage 352, sketchbook 354, scanned images 356 and uploading electronic formatted play 358. Each of steps 352-358 progress to subset protocols (as referenced in FIG. 15C) for selecting and identifying relevant components which are then assembled into a play which is uploaded to the play database.

Figure 15D:
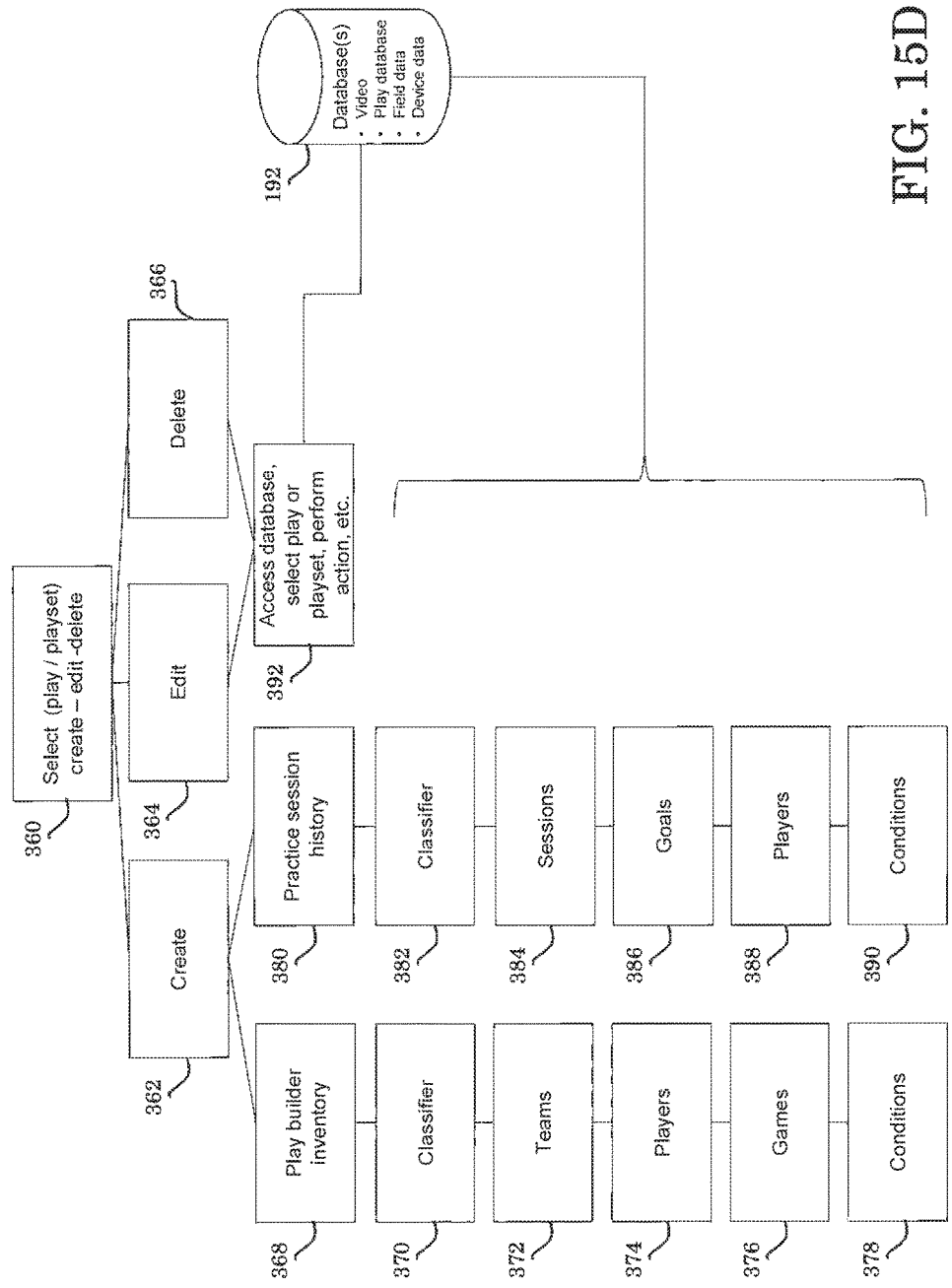

FIG. 15D provides an exemplary flow diagram of a Play Cataloger and Management System for assigning and storing/saving constructed plays from the play builder module. This includes Select 360, create 362, edit 364, and delete 366 steps. Create step 362 progresses to each of play builder inventory step 368 (progressing successively to each of Classifier 370, Teams 372, Players 374, Games 376 and Conditions 378 subset steps), as well as Practice session history step 380 (progressing successively to each of Classifier 382, Sessions 384, Goals 386, Players 388 and Conditions 390 subset steps). Both Edit 364 and Delete 366 progress to Access database, select play or playset, perform action, etc., step 392. Database 192 communicates with each of the access database step 392 as well as any of the subset protocol steps for each of play builder inventory 368 and practice session history 370.

Figure 15E:
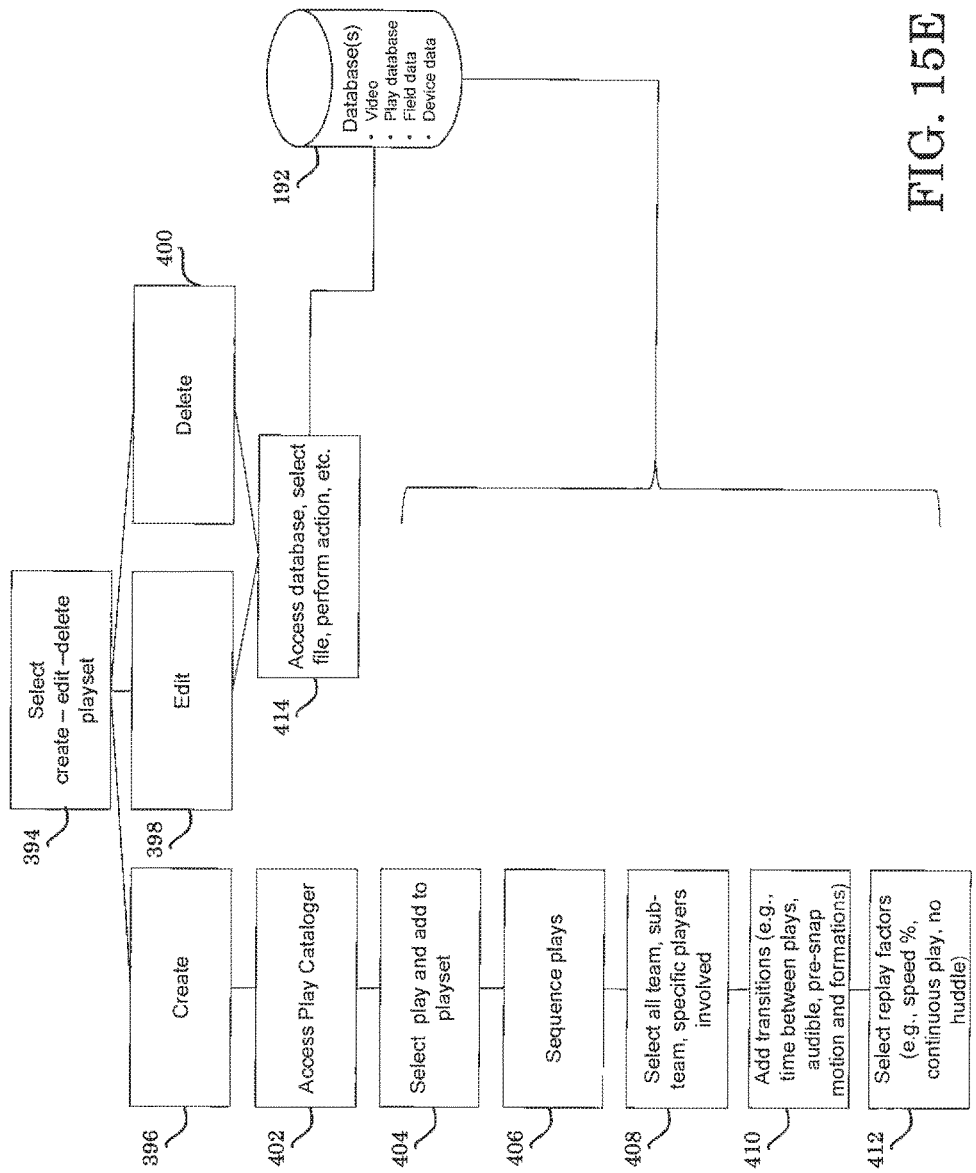

FIG. 15E teaches an exemplary Play Scripter/Trainer for providing each of select 394, create 396, edit 398 and delete 400 steps of plays previously constructed or edited. Create step 396 progresses in succession to each of access play cataloger step 402, select play and add to playset step 404, sequence play step 406, select all team, sub-team and specific players involved step 408, add transitions step 410 (e.g. time between plays, audible, pre-snap motion and formations) and select replay factors step 412 (e.g., speed percentage such as less or more than normal speed, continuous play, no huddle). Edit 398 and delete 400 steps each progress to Access database, select file and perform action step 414. System database 192 likewise communicates with the access database step 414 and each of the create 396 and progressing 402-412 steps.

Figure 15F:
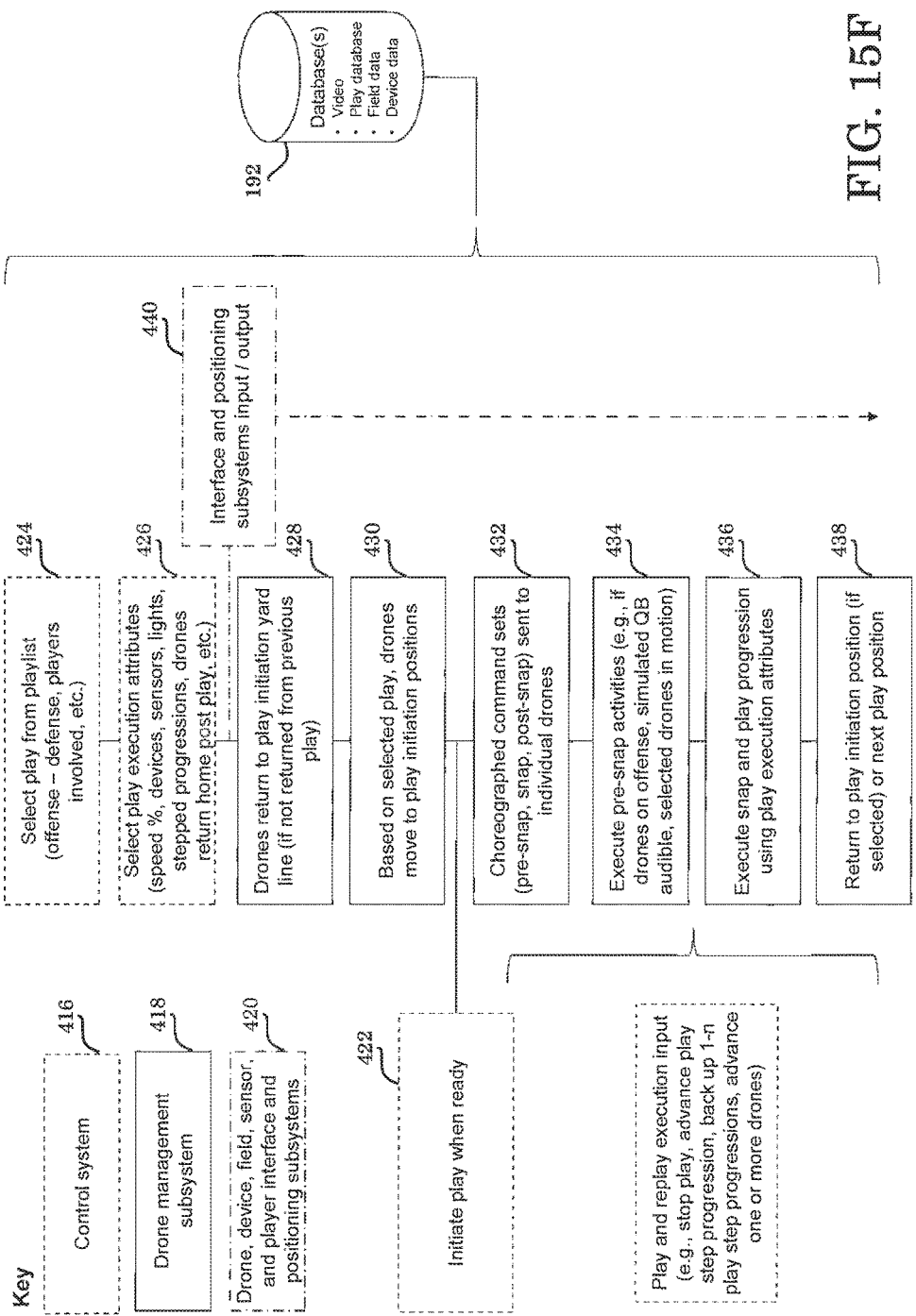

FIG. 15F provides an exemplary flow diagram of a Play and Replay Drone Controller for interfacing the operation of the drone(s), field, devices and sensors, such based on the previously assembled play parameters/records. Reference is made to the verbiage presented in the flow diagrams of FIGS. 15B-15F in support of the above descriptions and which includes Key located control system 416, drone management subsystem 418, and collection of drone, device, field, sensor, and positioning subsystems 420.

An initiate play when ready step 422 leads to each of select play from playlist step 424, select play execution attributes 426, drone return to play initiation position/yard line 428, move to play initiation position 430, choreographed command sets 432, execute pre-snap activities 434, execute snap and play progression using play execution attributes 436, and return to play initiation position or next play position 438. Steps 424-438 communicate with an interface and positioning subsystems input/output step 440, with database 192 communicating with all of the variables in FIG. 15F.

FIGS. 16A-16D illustrate examples of additional configurations to the drones (previously described at 90/92) which can be utilized as part of a game play system utilizing the field of play embedded lights/sensors, as well as standalone applications in which the robots/droids are provided without the field sensors (and such as supported upon a conventional play or practice surface such as shown at 10 in FIG. 1) for providing any type of individualized or choreographed simulation for providing positional player and team playing options.

This includes each version of a drone (also interchangeably referenced as a motorized tackling dummy according to a specific football application) which is similar in numerous respects to the original example depicted at 90/92, such including padded or otherwise, configured body supported upon a drive chassis or system and which can further include a control processor system which can interface with the external control platform software (see again FIG. 15) in order to both control the robot at a desired speed (such simulating real time game play, and including speeded up or slowed down according to the practice tempo desired). The robot/drone can also include the ability to provide output signals (such as in a two way communicating fashion with the control platform) such as in one instance providing data on impact position and intensity (such utilizing additional impact sensors built into the padding of the drone/tacking robot) and which interfaces with an impact/shock resistant output of the built in control circuitry which is in communication with the external control platform software 190.

Consistent with the above description, FIG. 16A depicts a first drone variant 202 which can integrate, into a midsection location 204, any of a continuous light band 206 or a plurality of individual lighting elements integrated into a similar shaped band 208. FIG. 16B depicts a further example, at 210, of a further variant of a robot/drone 210, such also including a pair of arms 212/214 which can be actuated by applicable control servo mechanisms built into the assembly in order to mimic certain player motions (such as pass blocking or the like) in sync with a play's execution. In this manner, the drone may be capable of extending an arm like mechanism vertically or extending torso like structure vertically such as to simulate jumping or raising hands while trying to deflect a pass.

FIG. 16C depicts a further example of a drone, at 216, which can include such as the pressure/impact sensors previously described (these shown at 218). Additional integrated microphone locations 220 are also depicted and which can interface with both the impact sensors and the integrated control features within the drone 216 (such as in one non-limiting instance to provide a lifelike audio output representative of a tackling event).

FIG. 16D depicts, at 222, a yet further variant of a drone which can be configured with a ball/object delivery mechanism, see side situated chamber 224, and within which a plurality of balls (see football object 226 and baseball object 228) are contained in a plural magazine fed fashion. The delivery mechanism 224 can be modified or configured (such as defining an interchangeable component configured for holding a plurality of a given type of ball or object) for providing repetitive delivery of the objects as well as enabling the ability to change or modify a flight trajectory of the object. This can include, in a baseball feed application, changing ball speed, various simulated hits and delivery (fastball, change-up, slider, etc.) and, in a football feed application, varying between short, medium and longer passes.

Figure 17:
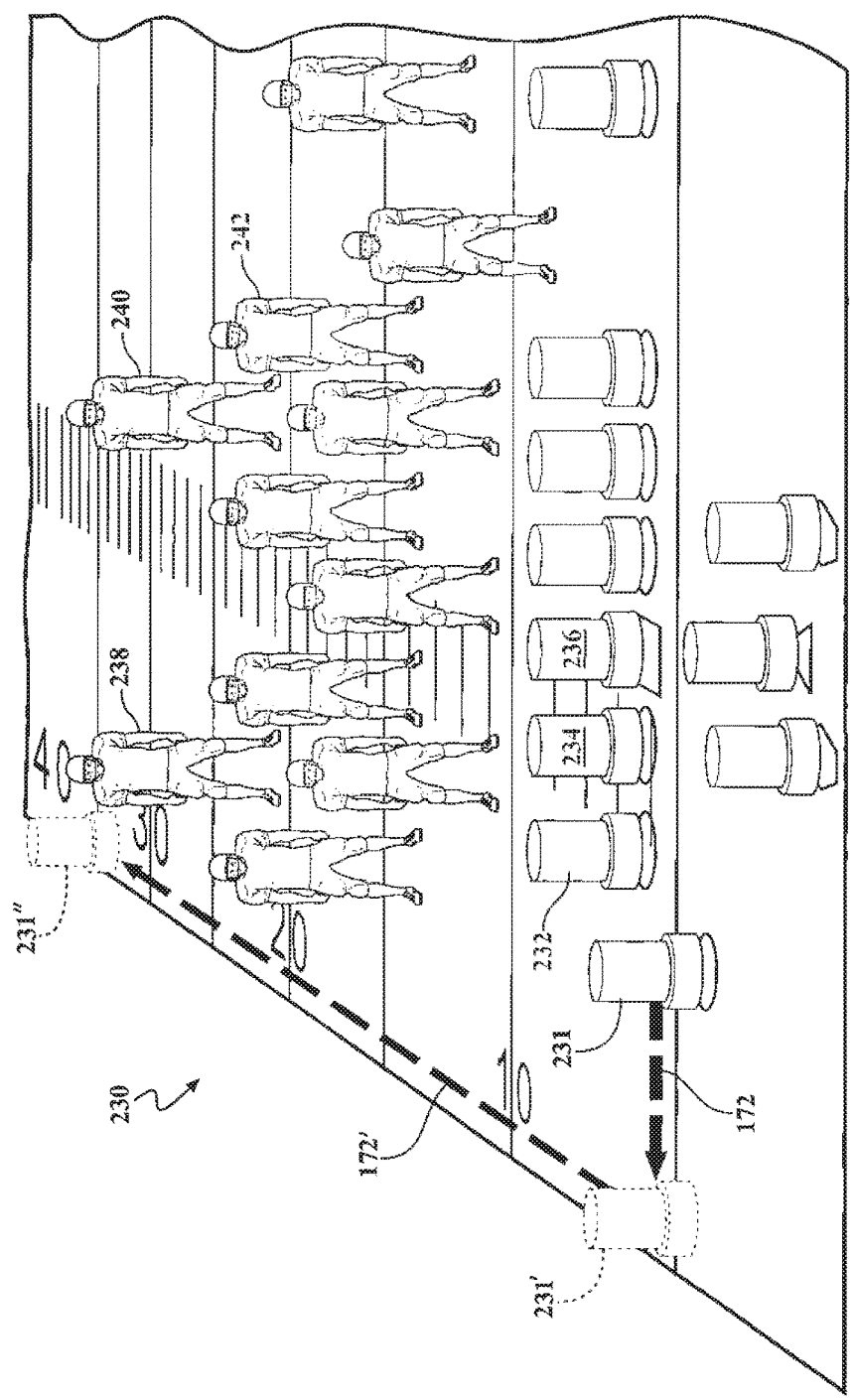
FIG. 17 is an illustration of a detail field of play view, such as utilizing droid options depicted in FIGS. 16A-16D and in which any of individual, unit or team training occurs, such as again with or without an associated grid of lighting/audial/pressure sensors.

FIG. 17 is an illustration, at 230, of a detail field of play view, such as utilizing droid options depicted in FIGS. 16A-16D and in which any of individual, unit, or team training occurs, such as again with or without an associated grid of lighting/audial/pressure sensors. This includes all of the play progression/cadences previously described in FIGS. 5-8 and FIG. 14 and by which an arrangement of drones 231, 232, 234, 236, et seq., are arrayed opposite a practicing squad of practicing players 238, 240, 242, et seq. Additional representations are depicted at 231' and 231" to correspond to intermediate (motion to left) and (downfield) ending positions for drone at starting position 231, such relating to planned routes 172 and 172', respectively (see also previously described in FIGS. 5-8 and FIG. 14).

Practice variants can include each of drone offense teams (or sub-teams) versus player defense unit (or sub-unit), drone defense teams versus player offense unit. The play progressions depictions noted and previously described can include representations as to how individual, unit and/or team play should unfold/progress. The control platform inputs can again provide a scripted play series (e.g., first drive no huddle) with actual play time adherence to recreate game like conditions, and can also control speed of play of the drones (e.g., in one envisioned range being calibrated at 25%-105% of estimated real time game play speed of a first unit of players as mimicked by the drones). Other additional features again include the control platform and output functionality providing replay of practiced plays with additional analytics/metrics for analyzing success (based upon determined metrics) of each practiced play.

By way of additional supporting explanation, the robot or drone related aspects of the present system further include such as a system of one or more drones designed to represent the coordinated execution of a play of a team member, a unit, or an entire team (e.g., receiver core, linemen, or team of 11 players in football) for the purposes of learning plays, training against opposing teams, evaluating talent, etc. in 3-D (i.e., full scale replay). In application, each drone is capable of representing the execution of a play for a particular team member at the desired speed of replay or execution.

As supported by the above-described, one version of the management system is capable of coordinating execution of 1 to n players (i.e., drones) in unison so as to represent the replay of play at the desired speed of replay or execution. One example execution/variant of the system can also be controlled to only have one player execute motion holding, with others still to support coach-player training session and then have drone in question return and then have drones execute plays in unison.

In this manner, each drone can be independently controlled via the external control platform communicating with the on board control aspects of the given drone, as well as coordinated in the 1-n groupings. In one related application, a sufficient enough plurality of drones can be coordinated (choreographed) in order to simulate a marching band practice with drones.

The ability to control the drones via the external processor driven control platform (such as integrating the aspects of the drone management system) can include any form of single or bidirectional communication protocols built into both the central processor and each of the on-board processor incorporated into each of the chassis driven drones. Variants include the use of entirely wireless protocols for operating and choreographing the individual drones (WiFi, Bluetooth, NFC or any other as disclosed herein). It is also envisioned that the sensor array built into the playing surface grids of FIG. 2 et seq. can also include individual transmitting capabilities to assist with ensuring real time response of the drones to the various instructions issued by the drone management system portion of the overall control platform.

Other drone applications envision incorporating variable motion and speed in 360 degrees, thereby making the hardware designs capable of representing a position player's routing and execution cadence of a play, such as again in a non-limiting football application mimicking a linemen pulling to block for a running back or a receiving running a route down the field.

The drones may further be capable of being sized to position representing (e.g., smaller versions for receivers and defensive backs and larger versions for line men). This could be accomplished via selectable static models (i.e., non-adjustable) or through a singular variant that has the capability of expanding a torso-like frame vertically and horizontally to provide proper level of sizing. For example, a lineman may be wider and taller which can obstruct the field of play more than a smaller lineman. This obstruction (e.g., seeing backfield) adds further realism to the replay system.

Drone options additionally provide for variable weight to better reflect position and support simulation against players. Through various approaches (e.g., adding a manual variable weighting system, separate models, adding water), the drone could represent the significant variance in player weight. Such a system would consider locating a center of gravity of weight for providing realism to the game play mimicking aspects of the drones. This would facilitate realism in training said position by offering a more difficult to move, push off, etc. drone (e.g., lineman training exercises).

Additional aspects include the drone capable of being programmable to a player's speed, quickness, agility, etc. based on previous player information (see again control platform protocol of FIG. 15 in combination with the drone options of 16A-16D). The drone is further configurable, along with the center of gravity design, to be capable of being tackled and of righting itself if knocked down.

The associated drone management system integrated into its internal control platform can be connected with suitable return or GPS locating functionality to support a return home motion for next play position or repeat of a previous play. Such return home functionality uses drone and player location tracking and planned destination to provide ongoing route planning to the returning robots so as to not run human players over during return home/return to position process. Such drones can also integrate an onboard camera system for providing an additional training metric in combination with both the onboard and external control platforms.

Consistent with the above descriptions, the drones may have onboard GPS, near-field, etc. system (and human players too) for recording of relative positions, as well as providing audio output capability, such as quarterback droid for calling plays, audibles, snap count, etc., to simulate play for offensive adjustment by team (i.e., offensive players and/or defensive). This simulation is part of training system to see if players react correctly to play changes. The data caching aspects of the control platform further provides for recording player movements, locations, etc. throughout play execution.

Additional features include the drones incorporating variable lighting systems (see again FIG. 16A) to highlight state levels including such as pre-snap, post-snap, ball in flight, ball caught, ball snapped/hiked, ball handed off, etc. Integrated lighting and audible output mechanisms also provide the ability to communicate or indicate state situation (e.g., defensive player tackled drone prior to ball be received, player moved early and touched drone to indicate an offsides situation).

Additional variants envision providing specialized drones for specific needs of position, this including such as a Quarterback drone capable of launching football for pass play execution or potential handoff and a Kicker/Punter-drone capable of projecting ball down field to simulate kick-offs and punts for return team practicing (or extending the Quarterback drone to project the ball as if it were a kick/punt). It is further envisioned that the drones employed will possess the ability to change behavior by programmatically changing the servo mechanism operation mode for different positional needs, via the drone and control management system. For example, and according to one non-limiting, exemplary application a drone employed in the present system could be programmed to either of the following:

Defensive drones with configurable algorithms to emulate allowable defensive player pursuit movements (e.g., bump within certain number of yards of the scrimmage line, stay within 3, 4, etc. yards of player, stay in front of player) and/or align with a emulate a given defensive scheme(s) and their variants such as (e.g., 3-4, 3-4 Cover 3 Zone Blitz, 4-3, 4-4, 5-2) using scheme-based assignments, rules/roles, and the like. Further they could be controlled to have a number of them based on proximity, position, etc. to pursue in a pack or swarm like fashion in pursuing the offense player. There also would be governing capabilities based on max drone speed, closing distance, and remaining field area to stop the pursuit.

Linemen drone with configurable algorithms so as to provide a configurable movement "resistance/push-back" or "resistance/advancement" setting so as to emulate a player's resistance to either being pushed back or pushing forward much like a lineman against lineman.

An associated drone management system, such again utilizing the onboard control platform which can operate independently and along with the central control platform of the system, can contain communication mechanism(s) to communicate and control any number of the drones as part of any simulated practice play scenario as described herein. One features can include the collected onboard drone data being sent back to control system, logged in a database, and available for future analysis, replay, review, etc.

Such a drone management system records a number of practice plays per player, team, etc. and can also record such things number of tackles, impact levels, etc. and provides replay analytics. Additional benefits of such a system include less impact on players, variable speed/skill training and the like.

Additional analytic aspects of the invention can further include adaptation of the associated control system and software platform to support player performance algorithms based on collected input information. Examples of these can include:

Player route performance compliance: compare route progression and cadence, deviation, location relative to planned ball flight (catchable or not), timing, etc. with playbook route plan;

Playbook testing: system projects play name on field or audibly says plays and player performs route while being recorded. Provide output report on adherence to play, pass/fail, etc.;

Team execution play adherence such as what % of players followed the play's design;

Team formation testing: show positions or use drones to represent offense and defense schemes and ask what play or setup should be executed;

Player/team blocking performance (e.g., which player blocked correct opponent, what % of players blocked correct players). Measurement could be captured, recorded, and analyzed by sensing opposition drone(s) being touched or pushed by player(s).

The associated replay system overview of the envisioned system provides for a full scale replay and practice system for individual and group activities (e.g., sports, band practice, law enforcement obstacle course training) where recording, learning, replaying, comparing, replaying, practicing, etc. routes, outlined movement sequences, line progression, etc. are an element of perfecting one's or a team's performance. Other aspects of the system can include providing on field demonstration of previously run (actual or practice) plays, such also including broadcasting such prior play representations in front of a live audience (such as during a half-time intermission of a game event).

The system is intended to support and individuals practice or learning through a control system of recording, designing, comparing, etc. where different mechanisms are used as the training platform:

a) A controllable system of lights, sensors, etc. integrated into the field of activity to:
  i. Demonstrate the designed/planned progressions (e.g., player routes, team routes, band practice, martial art forms)
  and/or
  ii. Record, replay, compare, etc. an individual's or team's progressions with the designed progressions
  and/or (can be used separately of in combination)

b) The use of controllable (individually, coordinated, subset) drones/droids/robots to
  i. Demonstrate the designed/planned progressions (e.g., player routes, team routes, band practice, martial art forms)
  and/or
  ii. Practice, record, and replay one's or team's performance against one or set of individually controllable drones/droids/robots Through the use of aforementioned system and technology, player learning, evaluation, practice sessions, etc. can be done more efficiently (e.g., reduced resource/practice team need), effectively (e.g., full-scale visualization, speed adjustable, repeatable), and with potentially less injuries.

Aspects of any type of robot/drone/droid (referenced below as drone) system details include, both as may have been previously listed and or newly listed below, each of the following bullet list features:

A control system using one or more drones designed to represent the coordinated execution of a play of a team member, a unit, or an entire team (e.g., receiver core, linemen, or team of 11 players in football) for the purposes of learning plays, training against opposing teams, evaluating talent, etc. in 3-D (i.e., full scale replay);

Each drone being capable of representing the execution of a play for a particular team member at the desired speed of replay or execution (e.g., 79% speed, 100% speed, 105% speed);

A drone management system being capable of coordinating execution of 1 to n players;

Drones acting in unison so as to represent the replay of play at the desired speed of replay or execution. One example execution/variant of said system can also be controlled to only have one player execute motion holding others still to support coach-player training session and then have drone in question return and then have drones execute plays in unison (subset feature includes each drone being independently controlled as well as coordinated in 1-n groupings;

Drone management system contains communication mechanism(s) to communicate play to run, ability to control one or more drones as part of play subset, ability to draw play and subsequently execute, etc;

Collected onboard drone data is sent back to control system, logged in database, and available for future analysis, replay, review, etc.;

Drone management system records number of practice plays per player, team, etc. Also records such things number of tackles, impact levels, etc. and provides replay analytics.

Drone management system coordinates execution of drone features according to proper timing (e.g., launching football, raising appendages, changing heights) required of play execution;

Control system manages determination and display of situation conditions (e.g., interference with receiving player off-sides by touching drone or being across the scrimmage line at time of play execution);

Drone functionality details may further include, both as previously articulated and as additionally referenced, any one or more drawn from the following bullet list:

- Drones have variable lighting system to highlight state levels: pre-snap, post-snap, ball in flight, ball caught, ball in flight, ball handed off, etc.;
- Integrated lighting and audible output mechanisms also provide ability to communicate or indicate state situation (e.g., defensive player tackled drone prior to ball be received, player moved early and touch drone to indicate an off-sides situation);
- Specialized drones (drone functionality) for specific positional needs:
  - Quarterback drone capable of launching football for pass play execution similar to pitching machine used in baseball or potentially handing off to a player. The Drone would be capable of holding a number of footballs for repetitive plays;
  - Each device object (e.g., football) contains a device/method for real-time tracking of its location so as the control system can determine, flag, and report situation conditions. An example would be to determining during the practice play/session whether a defensive player arrived too early knowing relative location of football, the defensive player, and the receiving drone. Touch sensors on the receiving drone could also be incorporated in determining the state condition;
  - Kicker-drone capable of projecting ball down field to simulate kick-off, punts, etc. for return team practicing;
  - Defensive drone with configurable algorithms to emulate allowable defensive player pursuit movements (e.g., bump opposition player within certain number of yards of the scrimmage line, stay within 3, 4, etc. yards of oppositional player, stay in front of oppositional player) and/or align with a emulate a given defensive scheme(s) and their variants such as (e.g., 3-4, 3-4 Cover 3 Zone Blitz, 4-3, 4-4, 5-2) using scheme-based assignments, rules/roles, and the like;
  - Linemen drone with controls algorithms to provide a configurable movement "resistance/pushback" or "resistance/advancement" setting so as to emulate a player either being pushed back or pushing forward much like a lineman against lineman.

Drone is capable of being programmed to a player's speed, acceleration/quickness, agility, etc. based on previous player information. Adjustments can be made to increase or decrease factors changing the performance difficulty of the training opposition.

Drones have audio output capability such as quarterback droid for calling plays, audible, snap count, etc. to simulate play for offensive adjustment by team (i.e., offensive players and/or defensive). This simulation is part of training system to see if other players react correctly to play changes. System records player movements, locations, etc. throughout play execution.

Drone supports variable motion and speed in 360 degrees thereby capable of representing position's routing and execution cadence of a play such as a linemen pulling to block for a running back or a receiving running a route down the field.

Drone options provides for variable weight to better reflect position and support simulation against players. Through various approaches (e.g., adding a manual variable weighting system, separate models, adding water) the drone could represent the significant variance in player weight. System would consider center of gravity of weight for realism in conjunction with the gravity/weight-based self-righting system. This would facilitate realism in training said position by offering a more difficult to move, push off, etc. drone (e.g., lineman training exercises).

Drone may be capable of being sized to position representing (e.g., smaller versions for receivers and defensive backs and larger versions for line men). This could be accomplished via selectable static models (i.e., non-adjustable) or through a singular variant that has the capability of expanding a torso-like frame vertically and horizontally to provide proper level of sizing. For example, a lineman may be wider and taller which can obstruct the field of play more than a smaller lineman. This obstruction (e.g., seeing backfield) adds further realism to the replay system.

Drone may be capable of extending arm like mechanism vertically or extending torso like structure vertically such as to simulate jumping or raising hands while trying to deflect a pass.

Drone is capable of being tackled and righting self if knocked down.

Drone management system supports a return home functionality for next play position or repeat of previous.

Return home functionality uses drone and player location tracking and planned destination to provide on-going route planning so as avoid human players and other drones during return home/return to position process.

Drones have an onboard sensor array to measure impact forces and location from events such as tackles, hand checks, etc.

Drones may have onboard GPS, near-field, etc. system (and players too) for recording of relative positions.

Additional analytic considerations including those both previously referenced and listed as follows:

- Control system supports player performance algorithms and analytics based on collected input information. Examples include:
  - Player routing performance compliance: compare route cadence, deviation, location relative to planned ball flight (catchable or not), timing, etc. with playbook route plan; in the case of a defensive player(s) example, analytics and metrics compare ideal and practiced alignment within a given scheme (e.g., stayed in zone, missed assignment, separation distance exceeded).

Playbook testing: system projects play name on field or audibly says plays and player performs route while being recorded. Provide output report on adherence to play, pass/fail, etc.

Team formation testing: show positions or use drones to represent offense and defense schemes and ask what play or setup should be executed.

Team execution play adherence (e.g., what % of players followed play design).

Player/team blocking performance (e.g., which player blocked correct opponent, what % of players blocked correct player). Measurement could be captured, recorded, and analyzed by sensing opposition drone(s) being touched or pushed by player(s).

Player tendency identification: identify player movement propensities and biases during play execution.

As previously described, aspects of the drone management system (DMS) software and methodology components can include utilizing an existing processor controlled and chassis driven assembly, known and non-limiting examples of which again including any of the mobile devices of Teevens U.S. Pat. No. 9,427,649, Kastner US 2016/0375337 and Peterson US 2013/0053189, with the choreographing software and operating algorithms of the drone management system and which enable scaled real-time training protocols for operating any plurality or combination of drones in any of individual or team-integrated fashion in order to provide life-like training protocols for practicing players/individuals. The DMS protocols can include the provision of the following components and concepts which enable the integration of any number of operating algorithms into the DMS such again including automated operating protocols for directing pre-set motions of the drone (or drones) such as in football with the offense mimicking drones training a defensive player (or players) with additional algorithms enabling real-time adjustment of the algorithmic operating protocols of the drones such as in football with the defense mimicking drones for responding to offense training player(s).

Understanding that the following represents each of components, concepts and applications which may have been described at least once previously, a condensed listing of such DMS dedicated functionalities is again stated as follows:

Key Components
  Drone management system or DMS (i.e., a computer-based system with inputs, outputs, savable media) controlling and coordinating the movement of 1 or more drones, devices, etc., essentially choreographing plays; and managing "play" recording and execution.
  Drones with the ability to represent a person's 2-dimension movement on a surface augmented with audio and visual inputs and outputs and sensors. Specialized drones for throwing, kicking, arm movement, etc. are included.
  Positional location of drones, associated devices, and involved players to provide input to DMS for drone movement execution.
  Drones and devices with audible inputs and outputs, visual outputs, and various accelerometers and sensors to measure impact, object/player proximities, etc.

Key Concepts
  Drone management system capable of orchestrating and coordinating in a choreographed manner one to many drone devices, emulating the full scale execution of players/people movements with the aim through drone training to increase the play or movement execution effectiveness of participants in an activity
    Sports examples: football, basketball, soccer, etc.
    Other: police (SWAT) and military tactical obstacle course training (drone representing assailants), routine development (band practice, gymnastics floor exercise), etc.
  Execute designed (i.e., playbook), game performed, practiced, etc. plays using full-scale, on-field offensive and/or defensive positional drones
    Includes play development adjustments such as inclusion of replicated (drone performed) player motion, quarterback audible (real time play adjustments)
  Choreographed drone movement
    Play execution with adaptable algorithms based on opposing team response
    Defensive schemes with adaptable algorithms based on offensive play response
      Smart defenses: rule-based defenses, zone schemes, man schemes, etc.
      Parameter-based: stay within x-feet, in front of player, between receiver and quarterback, etc.
  Precision controlled drones capable of emulating player movements
    Variable play execution with the ability to rewind and fast forward support stepped back and forward, etc., play progressions
    Variable play speed execution (e.g., 10%, 20%, 90%, 110%) to allow human player to learn and improve performance
    Location, speed, acceleration/deceleration control
    Players-specific execution and movement capabilities. For example, support ability to program a given drone to represent oppositional player(s) or high-level positional performer attributes (e.g. notable National Football League professional football players of past and present including Barry Sanders, Walter Payton, J J. Watt, Von Miller, Deion Sanders, etc. with playbook moves and representative speed and quickness
  Player development analytics
    Playbook knowledge and execution
    Identifying player tendencies
    Positional performance and training metrics
      How well defended against drone? Did they interfere?
      Response to quarterback audible
      Quarterback defense recognition such as formation testing/identification
      Defensive positional players adhering to designed scheme(s) execution goals, rules, etc.

Additional aspects of the replay system overview provided by the drone management system envision its use within a full scale replay and practice system for individual and group activities (e.g., sports, band practice, law enforcement obstacle course training) where recording, learning, replaying, comparing, replaying, practicing, etc. routes, outlined movement sequences, line progression, etc. are an element of perfecting one's or a team's performance.

The system is intended to support and individuals practice or learning through a control system of recording, designing, comparing, etc. where different mechanisms are used as the training platform:

c) a controllable system of lights, sensors, etc. integrated into the field of activity to:
  i. demonstrate the designed/planned progressions (e.g., player routes, team routes, band practice, martial art forms)
  and/or
  ii. record, replay, compare, etc. an individual's or team's progressions with the designed progressions
  and/or (can be used separately of in combination)
d) the use of controllable (individually, coordinated, subset) drones/droids/robots to
  ii. demonstrate the designed/planned progressions (e.g., player routes, team routes, band practice, martial art forms)
  and/or
  iii. practice, record, and replay one's or team's performance against one or set of individually controllable drones/droids/robots Through the use of aforementioned system and technology, player learning, evaluation, practice sessions, etc. can be done more efficiently (e.g., reduced resource/practice team need), effectively (e.g., full-scale visualization, speed adjustable, repeatable), and with potentially less injuries.

Benefits of utilizing the programmable and choreographed drones include less impact on players, the ability to provide for variable speed and skill level metrics in the programming by the drone management system and the adjusting the same for any number of practice team members (down to the individual level).

Figure 18:
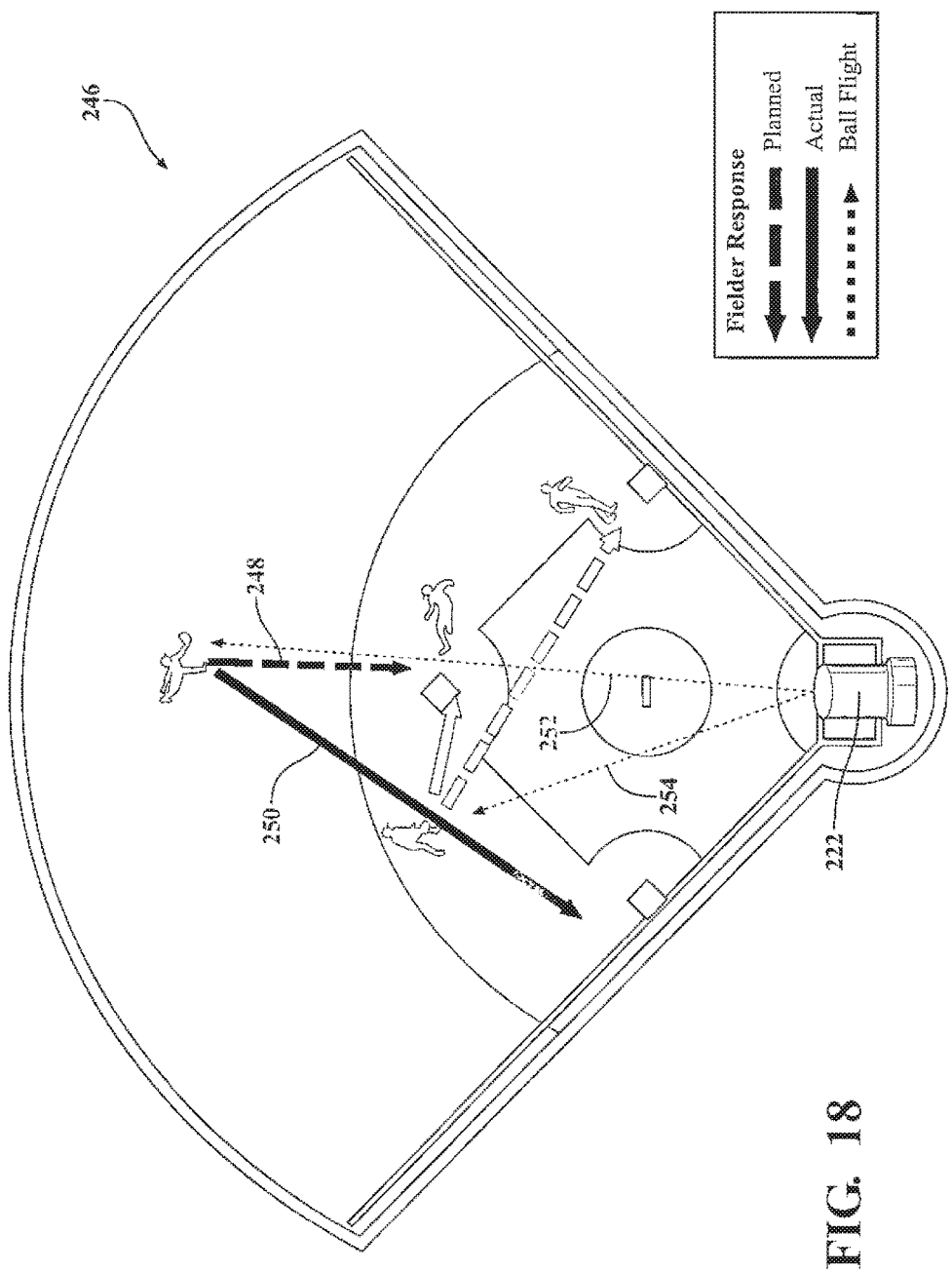
FIG. 18 is a general representation of a baseball diamond application of the present system incorporating a lighting grid pattern in combination with a ball delivery droid and providing for both of planned and actual fielder designated responses additional to ball flight depictions.

Finally, FIG. 18 is a general representation at 246 of a baseball diamond application of the present system incorporating a lighting grid pattern (not shown) in combination with a ball delivery droid (such as previously described at 222 in FIG. 16D) and providing for both of planned and actual fielder designated responses additional to ball flight depictions. Each of planned 248 and actual 250 field response motions are further indicated in response to ball flight designations, these shown at 252 and 254.

Apart from the variants described and illustrated herein in which the lights are projected upwardly from the playing or practice surface, additional envisioned embodiments can include substituting the light grid surface with pre-positioned light illuminating/projecting (e.g., such as laser or the like) components at various elevational and angled locations for projecting onto such a surface any or all of start, finish and continual progressing patterns (again according to any varying shape, pattern, size, line thickness or representation as described in detail throughout FIGS. 4-8) and at any speed or rate of progression. An application of this type may further envision the light projected (play or practice) surface also including any type of receptor or magnifying elements, such as which can assist in representing with better detail or clarity the light patterns projected form the remote/elevated locations. Related features can include the elevated/remote projecting components (alone or in combination with the play/practice surface) having the ability to project holographic images of any object (player, ball, tackling dummy/drone, etc.) relevant to the desired play, practice or training regimen employed.

Other envisioned applications may include non-athletic training protocols, such as associated with law enforcement, martial arts training, or military close quarter training scenarios, and which can in particular utilize any or all aspects of the present system (field or surface integrated lights/sensors and/or programmed drones) in order to replay tracing of positioning of the practicing individual during course testing in particular as to movements and timing.

I claim:

1. A management system for providing full scale training of a plurality of physical participants engaged in a team event, comprising:
   a plurality of self-propelling drones positioned at various locations upon a practice surface;
   a plurality of sensors either adapted to being worn by the physical participants or being located upon the practice surface;
   a control platform incorporating a first processor in communication with the sensors for tracking movement of each of the physical players and drones;
   a grid of lighting elements incorporated into the practice surface;
   the first processor and an associated database of said control platform communicating with said grid and operable to outputting a series of time elapsed commands, a sub-plurality of said lighting elements illuminating to represent an initial position of the drones;
   additional sub-pluralities of lighting elements being progressively illuminated in a time elapsed fashion to replicate movement of any of the participant or drone;
   a second processor incorporated into each of the drones, each of the second processors being in operative communication with the control platform, the second processors receiving sensor updated information as a stream of instructions for operating a powered drive chassis incorporated into each drone for traversing the drone upon the practice surface during a training iteration; and
   said control platform coordinating streams of instructions to the second processors for moving the drones in a synchronized and choreographed progression between start and end points so that the drones emulate a team of players opposing the physical players.

2. The management system as described in claim 1, further comprising a recording device in communication with said control platform for recording movements of the physical players, as well as any game objects and drones, and for communicating to a replay component of said control platform data associated with each preceding training iteration for any of replay, display, comparison or analysis.

3. The management system as described in claim 1, further comprising said sensors responding to movements of the physical participants by issuing at least one input, said input feeding signals to said first processor of said control platform for communicating to a further processor device for adjusting a speed and direction of each drone in response to the movements of the physical participants through a conclusion of the training iteration.

4. The management system as described in claim 3, said input further comprising the sensor adapted to being worn by the physical participant in communication with at least one additional sensor integrated into any of the drone, or another device, said sensors communicating with either of said first or second processors using any of Near Field Communication or acquired global positioning data for modifying the algorithmic protocols and resulting movement instructions issued to the drones during the training iteration.

5. The management system as described in claim 4, further comprising said participating player situated sensor being in communication, via said first processor, with a lighting element and sensor(s) incorporated into the practice surface, with additional sensors associated with any of a game device, object, ball or an opposing positional player.

6. The management system as described in claim 1, the drones each further comprising any of a movable and articulating throwing arm, extending arm, ball, object delivery or torso mechanism for simulating positional player functions.

7. The management system as described in claim 1, the control platform further comprising an exemplary play execution protocol associated with the management system and including at least one of a play builder module, a player management module, a play cataloger and management system, a play scripter/trainer, play and replay drone controller, and a play and player analytics module.

8. The management system as described in claim 4, said second processor further comprising additional algorithmic protocols for choreographing a sensor induced response of a drone not limited to any of reset/return to home functionality or mid-play adjustment of a drone such as in response to sensor read developing play parameters, in combination with interaction of the participant and drone supported sensors for preventing any of unintended drone-to-drone or drone-to-participant contact.

9. The management system as described in claim 4, further comprising the drone positioned sensors measuring impact forces and locations associated with the training iteration for communication to said control platform.

10. The management system as described in claim 1, further comprising global positioning systems integrated into at least one of a game object, the drone, a physical participant and a game device, in communication with the control platform.

11. The management system as described in claim 1, further comprising cameras mounted to each of the drones in communication with the control platform.

12. The management system as described in claim 2, further comprising player performance algorithms incorporated into said control platform and, in combination with said data collection and replay component, assessing metrics of participant performance during the training event.

13. The management system as described in claim 1, further comprising additional color controlled lighting elements adapted to being integrated into the participating player or game play ball or other game object for determining and providing visual indication of any of speed, acceleration or trajectory.

14. A management system for providing full scale training of a plurality of physical participants engaged in a team event, comprising:
- a plurality of self-propelling drones positioned at various locations upon a practice surface;
- a plurality of sensors either adapted to being worn by the physical participants or being located upon the practice surface;
- a grid of lighting elements arrayed upon the practice surface;
- a control platform incorporating a first processor in communication with the sensors for tracking movement of each of the physical players;
- a recording device in communication with said control platform for recording movements of the physical players and drones;
- a second processor incorporated into each of the drones, each of the second processors being in operative communication with the control platform, the second processors receiving sensor updated information as a stream of instructions for operating a powered drive chassis incorporated into each drone for traversing the drone upon the practice surface during a training iteration;
- said control platform coordinating streams of instructions to the second processors for moving the drones in a synchronized and choreographed progression between start and end points so that the drones emulate a team of players opposing the physical players, with a speed and direction of each drone being adjusted in response to the movements of the physical participants through a conclusion of the training iteration;
- said control platform further communicating with said grid of lighting elements and sensors and operable to output a series of time elapsed commands for selectively illuminating said lighting elements to represent progression of any of a player, drone or game object; and
- a replay module for presenting previously recorded physical player and drone movements.

15. A management system for providing full scale training of a plurality of physical participants engaged in a team event, comprising:
- a plurality of self-propelling drones positioned at various locations upon a practice surface;
- a plurality of sensors either adapted to being worn by the physical participants or being located upon the practice surface;
- a control platform incorporating a first processor in communication with the sensors for tracking movement of each of the physical players;
- a second processor incorporated into each of the drones, each of the second processors being in operative communication with the control platform, the second processors receiving sensor updated information as a stream of instructions for operating a powered drive chassis incorporated into each drone for traversing the drone upon the practice surface during a training iteration;
- said control platform coordinating streams of instructions to the second processors for moving the drones in a synchronized and choreographed progression between start and end points so that the drones emulate a team of players opposing the physical players;
- said sensors responding to movements of the physical participants by issuing at least one input, said input feeding signals to said first processor of said control platform for communicating to a further processor device for adjusting a speed and direction of each drone in response to the movements of the physical participants through a conclusion of the training iteration;
- said input further including the sensor adapted to being worn by the physical participant in communication with at least one additional sensor integrated into any of the drone, or another device, said sensors communicating with either of said first or second processors using any of Near Field Communication or acquired global positioning data for modifying the algorithmic protocols and resulting movement instructions issued to the drones during the training iteration; and
- said participating player situated sensor being in communication, via said first processor, with a lighting element and sensor(s) incorporated into the practice surface, with additional sensors associated with any of a game device, object, ball or physical player.

16. A management system for providing full scale training of a plurality of physical participants engaged in a team event, comprising:

a plurality of self-propelling drones positioned at various locations upon a practice surface;

a plurality of sensors either adapted to being worn by the physical participants or being located upon the practice surface;

a control platform incorporating a first processor in communication with the sensors for tracking movement of each of the physical players;

a second processor incorporated into each of the drones, each of the second processors being in operative communication with the control platform, the second processors receiving sensor updated information as a stream of instructions for operating a powered drive chassis incorporated into each drone for traversing the drone upon the practice surface during a training iteration;

color controlled lighting elements adapted to being integrated into at least one of the participating player, drone or game play ball for determining and providing visual indication of any of status, condition, speed, acceleration or trajectory; and said control platform coordinating streams of instructions to the second processors for moving the drones in a synchronized and choreographed progression between start and end points so that the drones emulate a team of players opposing the physical players.

* * * * *